(12) United States Patent
Cueto et al.

(10) Patent No.: US 9,785,259 B2
(45) Date of Patent: Oct. 10, 2017

(54) STYLUS-BASED SLIDER FUNCTIONALITY FOR UI CONTROL OF COMPUTING DEVICE

(71) Applicant: Barnes & Noble College Booksellers, LLC, Basking Ridge, NJ (US)

(72) Inventors: Gerald B. Cueto, San Jose, CA (US); Kourtny M. Hicks, Sunnyvale, CA (US)

(73) Assignee: BARNES & NOBLE COLLEGE BOOKSELLERS, LLC, Basking Ridge, NJ (US)

( * ) Notice: Subject to any disclaimer, the term of this patent is extended or adjusted under 35 U.S.C. 154(b) by 0 days.

(21) Appl. No.: 13/793,152

(22) Filed: Mar. 11, 2013

(65) Prior Publication Data

US 2014/0253520 A1  Sep. 11, 2014

(51) Int. Cl.
*G06F 3/0354* (2013.01)
*G06F 3/038* (2013.01)

(52) U.S. Cl.
CPC ........ *G06F 3/03545* (2013.01); *G06F 3/0383* (2013.01); *G06F 3/03548* (2013.01)

(58) Field of Classification Search
CPC ............. G06F 3/03545; G06F 3/04883; G06F 3/0488; G06F 3/0383; G06F 3/03548; G06F 3/03546; G06F 3/033; G06F 3/03542; G06F 3/037; G06F 3/0386; G06F 3/042; G06F 2203/04807; G06F 2203/04808; G05B 2219/13163; G05B 2219/23197;

(Continued)

(56) References Cited

U.S. PATENT DOCUMENTS 4,896,543 A  1/1990  Gullman
5,045,843 A * 9/1991  Hansen ................ G06F 3/0304
345/158

(Continued)

FOREIGN PATENT DOCUMENTS

EP  0722150 A1  7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Vinh Lam
(74) *Attorney, Agent, or Firm* — Finch & Maloney PLLC

(57) ABSTRACT

Techniques are disclosed for interacting with a computing device using a stylus. The stylus is configured with a slider control feature that can be activated to perform various actions while the stylus is touching or is otherwise sufficiently proximate to a stylus detection surface of the device. The slider function can be associated with a variety of tasks on the computing device such as: adjusting variables, executing a particular command, switching between tools, modifying a particular tool's settings, and launching an application. In some embodiments, the stylus-based slider is biased to return to a middle, or home, position thereby allowing for both forward and backward sliding actions. An appropriate animation or sound or haptic response can also be provided that may be indicative of or otherwise related to the action being taken.

21 Claims, 10 Drawing Sheets

(58) Field of Classification Search
CPC .......... G05B 2219/23383; G05B 2219/23385;
G05B 2219/23402; G05B 2219/35461;
G05B 2219/36372; G05B 2219/39521;
G05B 2219/40083; H04M 1/0285; G06K
7/10772; G06K 9/222; A63F 13/42; A63F
2009/0018; A63F 9/0641; A63F
2009/0645; G01D 9/30
USPC ............... 345/173–184; 178/18.01–20.04
See application file for complete search history.

(56) References Cited

U.S. PATENT DOCUMENTS

| | | | |
|---|---|---|---|
| 5,576,502 A | 11/1996 | Fukushima et al. | |
| 5,633,471 A | 5/1997 | Fukushima | |
| 5,844,557 A | 12/1998 | Shively, II | |
| 6,005,555 A | 12/1999 | Katsurahira et al. | |
| 6,259,438 B1 | 7/2001 | Fleck et al. | |
| 6,271,830 B1 | 8/2001 | Berstis | |
| 6,498,601 B1 | 12/2002 | Gujar et al. | |
| 6,577,299 B1* | 6/2003 | Schiller | G06F 3/0325 345/158 |
| 6,956,564 B1 | 10/2005 | Williams | |
| 7,292,229 B2 | 11/2007 | Morag et al. | |
| 7,646,379 B1 | 1/2010 | Drennan et al. | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,248,389 B2* | 8/2012 | Raif | G06F 3/03545 345/156 |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 8,994,657 B2* | 3/2015 | Liberty | A61B 5/1101 178/18.01 |
| 9,411,461 B2 | 8/2016 | Marshall et al. | |
| 9,483,138 B2 | 11/2016 | Harris et al. | |
| 9,589,538 B2 | 3/2017 | Davidson et al. | |
| 2001/0025289 A1 | 9/2001 | Jenkins et al. | |
| 2002/0047834 A1* | 4/2002 | Okamoto | G06F 1/1626 345/179 |
| 2002/0116421 A1 | 8/2002 | Fox et al. | |
| 2002/0134594 A1* | 9/2002 | Taylor | G06F 3/0346 178/18.01 |
| 2002/0190823 A1* | 12/2002 | Yap | G06F 1/1616 335/205 |
| 2003/0095115 A1* | 5/2003 | Brian | G06F 3/0346 345/179 |
| 2004/0095333 A1 | 5/2004 | Morag et al. | |
| 2004/0252110 A1* | 12/2004 | Defuans | G06F 1/1626 345/179 |
| 2005/0110777 A1 | 5/2005 | Geaghan et al. | |
| 2005/0156914 A1 | 7/2005 | Lipman et al. | |
| 2005/0200293 A1 | 9/2005 | Naugler et al. | |
| 2006/0267966 A1 | 11/2006 | Grossman et al. | |
| 2006/0284854 A1* | 12/2006 | Cheng | G06F 3/03545 345/173 |
| 2007/0047002 A1 | 3/2007 | Hull et al. | |
| 2007/0070053 A1 | 3/2007 | Lapstun et al. | |
| 2007/0176908 A1 | 8/2007 | Lipman et al. | |
| 2008/0012835 A1 | 1/2008 | Rimon et al. | |
| 2008/0036747 A1 | 2/2008 | Hope | |
| 2008/0231613 A1* | 9/2008 | Tsai | G06F 3/03545 345/179 |
| 2008/0309621 A1 | 12/2008 | Aggarwal et al. | |
| 2009/0078476 A1 | 3/2009 | Rimon et al. | |
| 2009/0115722 A1 | 5/2009 | Shan et al. | |
| 2009/0115744 A1 | 5/2009 | Zhang et al. | |
| 2009/0167728 A1 | 7/2009 | Geaghan et al. | |
| 2010/0013792 A1 | 1/2010 | Fukushima | |
| 2010/0021022 A1 | 1/2010 | Pittel et al. | |
| 2010/0084468 A1 | 4/2010 | Lapstun | |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0238521 A1* | 9/2010 | Rusman | G06F 3/014 358/475 |
| 2010/0259482 A1 | 10/2010 | Ball | |
| 2010/0262659 A1 | 10/2010 | Christiansen et al. | |
| 2010/0277327 A1* | 11/2010 | Lee | G06F 1/30 340/636.16 |
| 2010/0318895 A1 | 12/2010 | Steinberger et al. | |
| 2010/0321345 A1 | 12/2010 | Pearce et al. | |
| 2011/0012849 A1* | 1/2011 | Cho | G06F 1/1626 345/173 |
| 2011/0115741 A1* | 5/2011 | Lukas | G06F 21/32 345/174 |
| 2011/0163972 A1* | 7/2011 | Anzures | G06F 3/04886 345/173 |
| 2011/0169756 A1 | 7/2011 | Ogawa et al. | |
| 2011/0193776 A1 | 8/2011 | Oda et al. | |
| 2011/0216091 A1 | 9/2011 | Song et al. | |
| 2011/0241832 A1 | 10/2011 | Lipman et al. | |
| 2011/0241988 A1 | 10/2011 | Bensler | |
| 2011/0242006 A1 | 10/2011 | Thompson et al. | |
| 2011/0258542 A1 | 10/2011 | Kenney et al. | |
| 2011/0304577 A1 | 12/2011 | Brown et al. | |
| 2012/0032880 A1 | 2/2012 | Kim et al. | |
| 2012/0032909 A1* | 2/2012 | Wang | G06F 3/0416 345/174 |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0194457 A1* | 8/2012 | Cannon | G06F 3/011 345/173 |
| 2012/0212412 A1 | 8/2012 | Mizuno et al. | |
| 2012/0221938 A1 | 8/2012 | Patterson et al. | |
| 2012/0229428 A1 | 9/2012 | Tavakoli et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280911 A1 | 11/2012 | Su | |
| 2012/0280947 A1 | 11/2012 | Weaver et al. | |
| 2012/0280950 A1 | 11/2012 | Stephanick et al. | |
| 2012/0311438 A1 | 12/2012 | Cranfill et al. | |
| 2012/0327040 A1 | 12/2012 | Simon et al. | |
| 2012/0329529 A1 | 12/2012 | van der Raadt | |
| 2012/0331546 A1 | 12/2012 | Falkenburg et al. | |
| 2013/0016045 A1 | 1/2013 | Zhao et al. | |
| 2013/0036383 A1 | 2/2013 | Yuan et al. | |
| 2013/0038579 A1* | 2/2013 | Boyd | B43K 7/02 345/179 |
| 2013/0044083 A1* | 2/2013 | Basnett | G06F 1/325 345/179 |
| 2013/0057505 A1* | 3/2013 | Yu | G06F 3/046 345/174 |
| 2013/0063364 A1 | 3/2013 | Moore | |
| 2013/0063366 A1* | 3/2013 | Paul | G06F 3/0416 345/173 |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0082937 A1* | 4/2013 | Liu | G06F 1/3262 345/173 |
| 2013/0082976 A1* | 4/2013 | Kang | G06F 3/0418 345/174 |
| 2013/0088464 A1* | 4/2013 | Pearce | G06F 3/03545 345/179 |
| 2013/0100022 A1* | 4/2013 | Thompson | G06F 3/033 345/163 |
| 2013/0106714 A1* | 5/2013 | Shahparnia | G06F 1/3203 345/173 |
| 2013/0106719 A1* | 5/2013 | Sundara-Rajan | G06F 3/03545 345/173 |

(56) References Cited

U.S. PATENT DOCUMENTS

| | | | |
|---|---|---|---|
| 2013/0106723 A1* | 5/2013 | Bakken | G06F 3/03545 345/173 |
| 2013/0106731 A1 | 5/2013 | Yilmaz et al. | |
| 2013/0106782 A1* | 5/2013 | Nowatzyk | G06F 3/03545 345/175 |
| 2013/0106796 A1* | 5/2013 | Yilmaz | G06F 3/03545 345/179 |
| 2013/0106798 A1* | 5/2013 | Sundara-Rajan | G06F 3/0383 345/179 |
| 2013/0106800 A1* | 5/2013 | Yilmaz | G06F 3/03545 345/179 |
| 2013/0113699 A1 | 5/2013 | Lim | |
| 2013/0113723 A1 | 5/2013 | Chen et al. | |
| 2013/0113762 A1* | 5/2013 | Geaghan | G06F 3/044 345/179 |
| 2013/0120271 A1 | 5/2013 | Lee et al. | |
| 2013/0120463 A1 | 5/2013 | Harris | |
| 2013/0125068 A1* | 5/2013 | Harris | G06F 3/04883 715/863 |
| 2013/0135220 A1 | 5/2013 | Alameh et al. | |
| 2013/0135234 A1 | 5/2013 | Hisano et al. | |
| 2013/0135262 A1 | 5/2013 | Alameh et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0162589 A1* | 6/2013 | Lien | G06F 3/046 345/174 |
| 2013/0176247 A1 | 7/2013 | Jogo et al. | |
| 2013/0185680 A1 | 7/2013 | Chaudhri et al. | |
| 2013/0194308 A1 | 8/2013 | Privault et al. | |
| 2013/0201162 A1 | 8/2013 | Cavilia | |
| 2013/0207937 A1* | 8/2013 | Lutian | G06F 3/042 345/175 |
| 2013/0229333 A1 | 9/2013 | Schwartz et al. | |
| 2013/0229389 A1 | 9/2013 | DiVerdi et al. | |
| 2013/0229390 A1 | 9/2013 | DiVerdi | |
| 2013/0229391 A1* | 9/2013 | DiVerdi | G06F 3/0488 345/179 |
| 2013/0285934 A1 | 10/2013 | Ting et al. | |
| 2013/0321305 A1 | 12/2013 | Liang et al. | |
| 2013/0321360 A1* | 12/2013 | Huang | G01B 3/06 345/179 |
| 2014/0002422 A1 | 1/2014 | Stern et al. | |
| 2014/0028577 A1* | 1/2014 | Krah | G06F 3/0416 345/173 |
| 2014/0028634 A1 | 1/2014 | Krah et al. | |
| 2014/0049467 A1* | 2/2014 | Laligand | H04N 21/42207 345/157 |
| 2014/0078116 A1* | 3/2014 | Mercea | G06F 1/266 345/179 |
| 2014/0085269 A1* | 3/2014 | Armstrong-Muntner | G06F 3/03545 345/179 |
| 2014/0092069 A1 | 4/2014 | Bentov | |
| 2014/0098033 A1 | 4/2014 | Simmons | |
| 2014/0104224 A1* | 4/2014 | Ih | G06F 3/044 345/174 |
| 2014/0111426 A1* | 4/2014 | Inamoto | G06F 3/038 345/156 |
| 2014/0146021 A1* | 5/2014 | Trethewey | G06F 3/0488 345/179 |
| 2014/0150026 A1* | 5/2014 | Mountain | G06F 3/0485 725/52 |
| 2014/0160089 A1* | 6/2014 | Fletcher | G06F 3/0383 345/179 |
| 2014/0168175 A1 | 6/2014 | Mercea et al. | |
| 2014/0168176 A1 | 6/2014 | Nowatzyk et al. | |
| 2014/0192028 A1 | 7/2014 | Leydon | |
| 2014/0210797 A1* | 7/2014 | Kreek | G06F 3/0488 345/179 |
| 2014/0232693 A1 | 8/2014 | Schuckle et al. | |
| 2014/0267120 A1 | 9/2014 | Zhang et al. | |
| 2014/0347329 A1* | 11/2014 | Ware | G06F 3/0383 345/179 |
| 2015/0002486 A1 | 1/2015 | Valicek et al. | |
| 2015/0029162 A1* | 1/2015 | Harris | G06F 3/03545 345/179 |
| 2015/0040243 A1 | 2/2015 | Mittal | |
| 2015/0074578 A1 | 3/2015 | Liang et al. | |
| 2015/0103040 A1* | 4/2015 | Huang | G06F 3/03545 345/174 |
| 2015/0169059 A1 | 6/2015 | Behles et al. | |
| 2015/0205479 A1 | 7/2015 | Zhu et al. | |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—

(56) References Cited

OTHER PUBLICATIONS news and rumors you care about, http://www.macrumors.com/2012/01/23/multi-touch-page-flipping-ebook-concept-shown-6 pages, printed from the Internet on Nov. 3, 2012.
"Desktop Touchscreens,"—Desktop touchscreens explained, http://www.touchscreenmagazine.nl/touchscreen-solutions/desktop-touchscreens, 1 page, printed from the Internet on Nov. 3, 2012.
"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.
"Padblue 2," BRANDO—mobile.brando.com, http://mobile.brando.com/Padblue-2_p9162c1577d94.html., 4 pages, printed from the Internet on May 10, 2013.
Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.
"Bluetooth 4.0 SmartPen the future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=, 1 page, printed from the Internet on Jan. 15, 2013.
PAiA-Touch Switches, PAiA Corporation USA, file:///S:/Client%20Files/Barnes%20&%20Noble/IDS%20Master%20Folder/S&G%20-%2 . . . , 3 pages, printed from the Internet on Aug. 27, 2013.

\* cited by examiner

STYLUS-BASED SLIDER FUNCTIONALITY FOR UI CONTROL OF COMPUTING DEVICE

RELATED APPLICATIONS

This application is related to U.S. application Ser. No. 13/793,478 filed Mar. 11, 2013 and titled "Stylus-Based Pressure-Sensitive Area for UI Control of Computing Device" and to U.S. Application Ser. No. 13/793,256 filed Mar. 11, 2013 and titled "Stylus-Based Touch-Sensitive Area for UI Control of Computing Device." Each of these applications is herein incorporated by reference in its entirety.

FIELD OF THE DISCLOSURE

This disclosure relates to electronic computing devices, and more particularly, to stylus-based user interface techniques for interacting with electronic computing devices.

BACKGROUND OF THE INVENTION

Electronic display devices such as tablets, eReaders, mobile phones, smart phones, personal digital assistants (PDAs), and other such touch screen electronic, display devices are commonly used for displaying consumable content. The content may be, for example, an eBook, an online article or blog, images, documents, a movie or video, and the like. Such display devices are also useful for displaying a user interface that allows a user to interact with the displayed content. The user interface may include, for example, one or more touch screen controls and/or one or more displayed labels that correspond to nearby hardware buttons. The user may interact with the touch-sensitive device using fingers, a stylus, or other implement. The touch screen display may be backlit or not, and may be implemented for instance with an LED screen or an electrophoretic display. Such devices may also include other touch-sensitive surfaces, such as a track pad (e.g. capacitive or resistive touch sensor) or touch-sensitive housing (e.g., acoustic sensor).

DETAILED DESCRIPTION

Figure 1A:
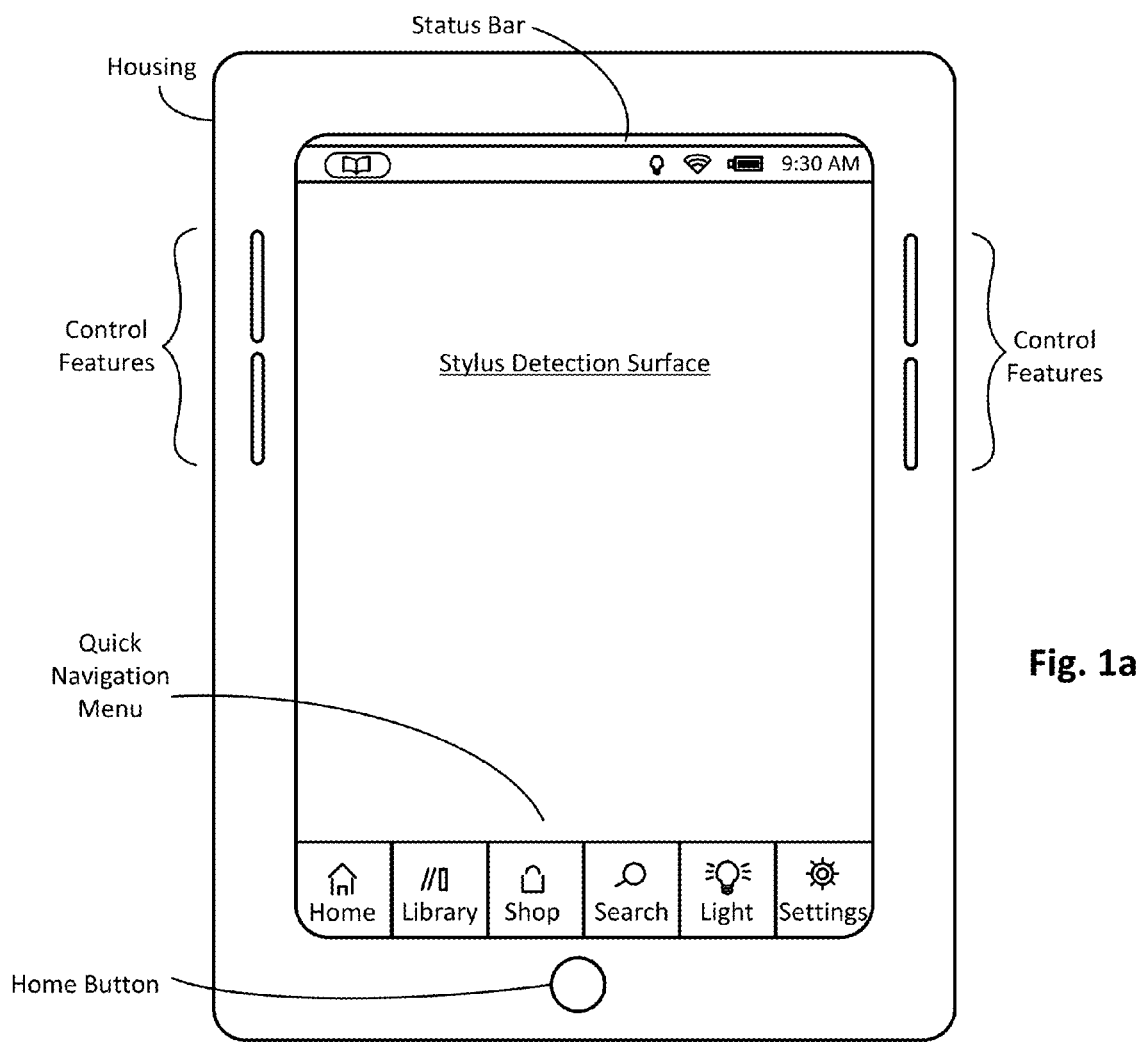
FIGS. 1a-b illustrate an example electronic computing device configured in accordance with an embodiment of the present invention.

Techniques are disclosed, for interacting with a computing device using a stylus. The stylus is configured with one or more control features that can be activated to perform various actions while the stylus is touching or otherwise sufficiently proximate to a stylus detection surface of the device, in one embodiment, the stylus includes a mechanical slider (slider), and the slider function can be associated with a variety of tasks on the computing device such as adjusting variables, executing a particular command, switching between tools, modifying a particular tool's settings, and launching an application. In some embodiments, the stylus-based slider function is biased to return to a middle, or home, position thereby allowing for both forward and backward sliding actions. In some such embodiments, for example, when the stylus-based slider function is engaged in a forward fashion or a backward fashion, it can change variables or tool features such as volume, font size, font type, colors, line thickness or hardness, margin size, and other such variables. In other such embodiments, the stylus-based slider function can be engaged in a forward fashion or a backward fashion to invoke an undo or redo command, or to launch a specific application. In some cases, the stylus may have a processor or some degree of intelligence and a power source, if so desired, but such optional components are not needed. An appropriate animation or sound or haptic response can also be provided that may be indicative of or otherwise related to the action being taken. Other embodiments may include similar functionality with one or more different stylus-based control features, such as a push-button, a rotatable knob, a touch-sensitive surface, or a pressure sensitive surface, to name a few examples. As will be appreciated in light of this disclosure, the attributes of the control feature can be tailored to the target function or functions to be performed and/or to the targeted use case (e.g., student attending class in classroom or via a cloud-based educational program) so as to provide a more intuitive user experience.

General Overview

As previously explained, electronic display devices such as tablets, eReaders, and smart phones are commonly used for displaying user interfaces and consumable content. In some instances, the user might desire to switch tools within a particular application, or customize the settings within a particular tool in a given application. For instance, the user might wish to change the font in a word processing or eReader application, or change from a pencil tool to a paintbrush tool. While many electronic devices provide for a series of actions for interacting with a device to make such changes, there does not appear to be an intuitive stylus-based user interface for doing so.

Thus, and in accordance with an embodiment of the present invention, stylus-based techniques are provided for performing functions in electronic devices using stylus control feature actions while the stylus is touching, or otherwise sufficiently proximate to a stylus detection surface of the device. To this end, direct contact with the stylus detection surface is not necessary. A stylus-based control feature action, such as pushing the top button or slider of the stylus, may be associated with a function such as increasing volume, increasing, font size, creating a note (e.g., such as notes taken during an educational lecture, or a message for another user of the device, or a reminder, etc), undo, recording a lecture or other ambient sounds, etc. In a more general sense, any uniquely identifiable stylus control feature action or combination of actions performed while touching or otherwise sufficiently proximate to a stylus detection surface may be configured to perform a stylus or device function. In some embodiments, the stylus may be pointing to a specific selection of content or a tool, a UI control feature or icon, or a specific area of a stylus-sensitive display. In such an example, the stylus action may be used to perform an operation on the selected content, change tools or cycle through a given tool's customizations, open the selected file or application, manipulate the UI control feature, etc. In one specific such example case, a stylus action may be associated with a different function depending on the area of the stylus detection surface with which the stylus is directly contacting or hovering over, or otherwise sufficiently proximate to so as to cause a detectable event in that area of the stylus detection surface. In other embodiments, the stylus action may be configured to perform a certain function regardless of whether content is selected, or where the stylus is pointing. In some such selection-free embodiments, the stylus action may perform a certain function based on a currently running application, or a specific stylus control feature may be globally associated with a specific device function. For instance, a selection-free stylus control feature action may be used to trigger an undo or redo command, or to launch a given application (e.g., launch a browser for conducting online research, or a text messaging application to notify peers in a study group of a particular question or a new meeting time, or a sound/video recording application while attending a lecture, or an application that transcribes handwritten notes on a touch-sensitive display of the computing device into a text file). Numerous selection-free stylus actions will be apparent in light of this disclosure, and such functions may be user-configurable or hard-coded such that no or minimal user-configuration is necessary.

In some embodiments, the stylus-based control feature may be a stylus-based slider. In some specific such embodiments, the stylus-based slider function is biased to return to a middle or home position thereby allowing for both forward and backward sliding actions, so as to provide for a broader range of uniquely identified slider-based functions. As previously explained, the stylus-based slider function can be associated with a variety of tasks on the computing device. For example, in some such embodiments, when the stylus-based slider control feature is engaged in a forward fashion and/or a backward fashion, it can change variables or tool features such as volume, font size, font type, colors, line thickness or hardness, margin size, and any other such variables adjustable by a user interface control feature. In other such embodiments, the stylus-based slider control feature can be engaged in a forward fashion and/or a backward fashion to invoke an undo or redo command, or to launch a specific application.

In some embodiments, the stylus action may be combined with or otherwise preceded by a content selection action (e.g., a single item selection, a select-and-drag action, a book-end selection where content between two end points is selected, or any other available content selection technique). As will be appreciated, the stylus may be used to make the content selection, but it need not be rather, content may be selected using any means. In one example embodiment, the user may select a section of text, and then perform the copy function or other function assigned to a stylus control feature), which will save the selected text onto the stylus. In a more general sense, the stylus may be used to perform functions on content that was pre-selected with or without the stylus, or to simultaneously select and perform functions on target content. The degree to which the selection and other functions overlap may vary depending on factors such as the type of content and the processing capability of the stylus and/or related device.

In some example embodiments, the stylus actions are accompanied with animation, sound and/or haptic effects to further enhance the user interface experience. For example, copy animation might show a vortex or sucking of the selected content into the stylus if the stylus action is being used to copy content into the stylus or other target location. In a similar fashion, a volume increase animation might show a speaker with an increasing number of sound waves coming from it if the stylus action is being used to increase volume. If a selection-free no-contact undo stylus action is being executed, then a sound could accompany the undo function, such as a custom sound selected by the user, or any other suitable sound. A combination of animation, sound, haptic and/or other suitable notifications can be used as well, as will be appreciated in light of this disclosure.

The techniques have a number of advantages, as will be appreciated in light of this disclosure. For instance, in some cases, the techniques can be employed to provide a discreet and intuitive way for a user to interact with a device without overly distracting the user (or others nearby) from other events occurring during the interaction. For instance, in some such embodiments, a student attending a lecture (either live or via a network) can activate note taking and voice recording applications via stylus-based control actions, without having to look at the device for with minimal looking). In such cases, for instance, the student can hold the stylus generally over the stylus-sensitive surface while still maintaining focus and concentration on the lecturer and presentation materials, and readily activate tools that can supplement the educational experience.

Numerous uniquely identifiable engagement and notification schemes that exploit a stylus and a stylus detection surface to effect desired functions without requiring direct contact on the touch-sensitive surface can be used, as will be appreciated in light of this disclosure. Further note that any stylus detection surface (e.g., track pad, touch screen, electro-magnetic resonance (EMR) sensor grid, or other stylus-sensitive surface, whether capacitive, resistive, acoustic, or other stylus-detecting technology) may be used to detect the stylus action and the claimed invention is not intended to be limited to any particular type of stylus detection technology, unless expressly stated.

Architecture

Figure 1B:
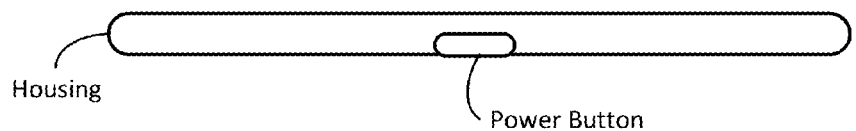

FIGS. 1a-b illustrate an example electronic computing device with a stylus detection surface configured to detect stylus-based control feature actions, in accordance with an embodiment of the present invention. As can be seen, in this example embodiment, the stylus detection surface is a touch screen surface. The device could be, for example, a tablet such as the NOOK® tablet or eReader by Barnes & Noble. In a more general sense, the device may be any electronic device having a stylus detection user interface and capability for displaying content to a user, such as a mobile phone or mobile computing device such as a laptop, a desktop computing system, a television, a smart display screen, or any other device having a stylus detection display or a non-sensitive display screen that can be used in conjunction with a stylus detection surface. As will be appreciated, the claimed invention is not intended to be limited to any particular kind or type of electronic device.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search. Light, and Settings) and a status bar that includes a number of icons (a night-light icon, a wireless network icon, and a book icon), a battery indicator, and a clock. Other embodiments may have fewer or additional such user interface features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2 exit a configuration sub-menu; and 3) put the device to sleep. As can be further seen, the status bar may also include a book icon (upper left corner). In some cases, selecting the hook icon may provide bibliographic information on the content provide the main menu or table of contents for the book, movie, playlist or other content.

Figure 1C:
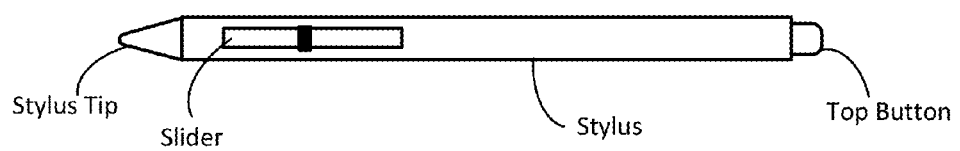
FIG. 1c illustrates an example stylus that can be used with a computing device such as the one shown in FIGS. 1a-b, and is configured in accordance with an embodiment of the present invention.

FIG. 1c illustrates an example stylus for use with an electronic computing device configured in accordance with an embodiment of the present invention. As can be seen, in this particular configuration, the stylus comprises a stylus tip used to interact with the stylus detection surface (by either direct contact or hover over interaction, or otherwise sufficiently proximate indirect contact) and control features including a top button and a slider along the shaft of the stylus. In this example, the stylus tip has a rounded triangular shape, while in alternative embodiments the stylus tip may be more rounded, or any other suitable shape. The stylus tip may be made of any number of materials of different textures and firmness depending on the needs of the specific device. The stylus may include fewer or additional control features than the top and side buttons illustrated in FIG. 1c, or different control features altogether. Such control features may include, for example, a rotating knob, a switch, a pressure switch, a touch-sensitive surface, or other suitable control feature that will be apparent in light of this disclosure. The principles disclosed herein equally apply to such control features. Various stylus examples depicted and discussed herein are provided with slider control features, which may provide the user with an enhanced user experience. The stylus may be a passive or active stylus, or any other suitable implement for interacting with the device and performing direct (touching) or indirect (not touching, but sufficiently close so as to be detectable by the stylus detection surface) contact actions. As will be appreciated, the claimed invention is not intended to be limited to any particular kind or type of stylus.

Figure 1D:
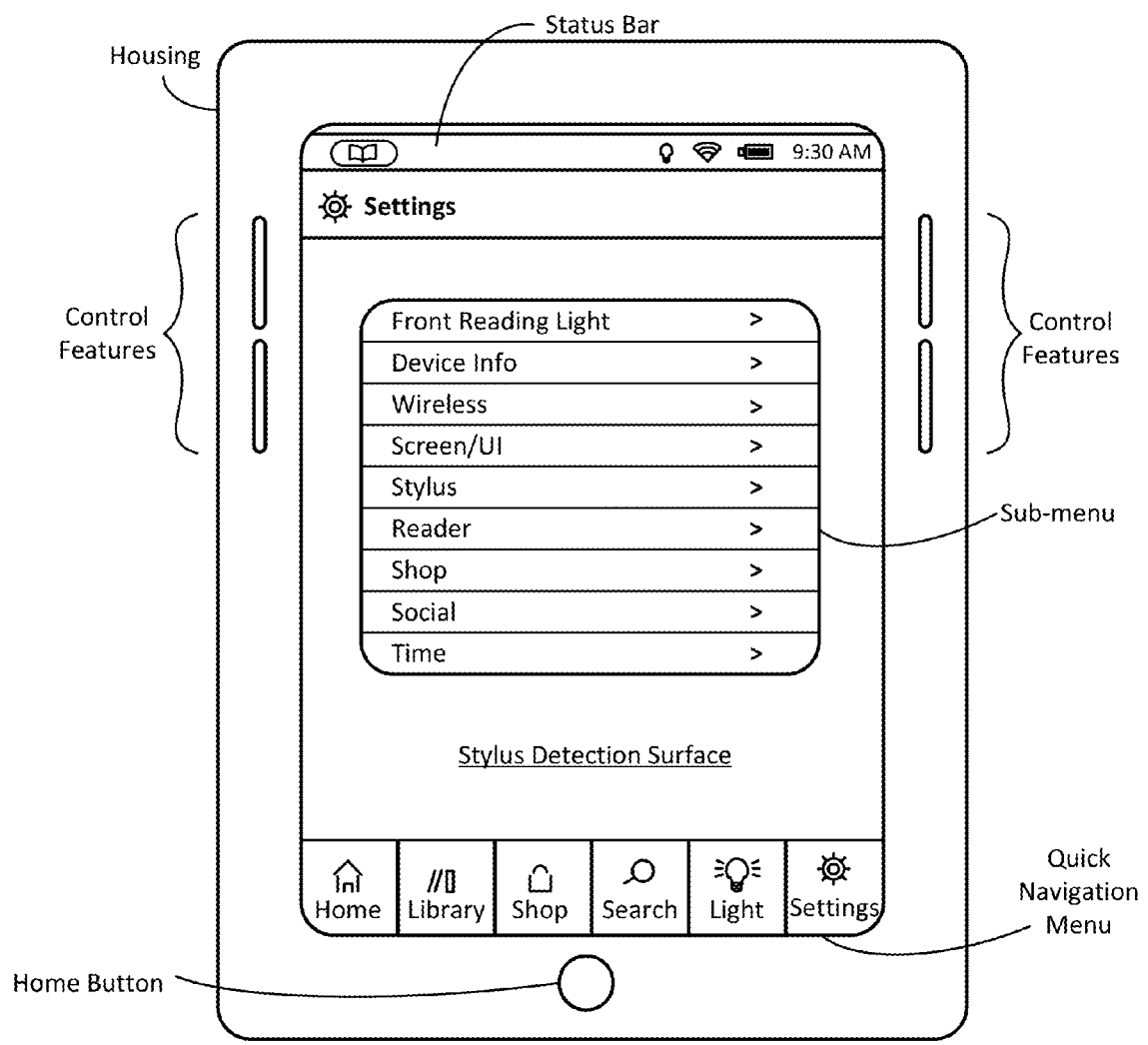
FIGS. 1d-e illustrate example configuration screen shots of the user interface of the electronic device shown in FIGS. 1a-b, configured in accordance with an embodiment of the present invention.
Figure 1E:
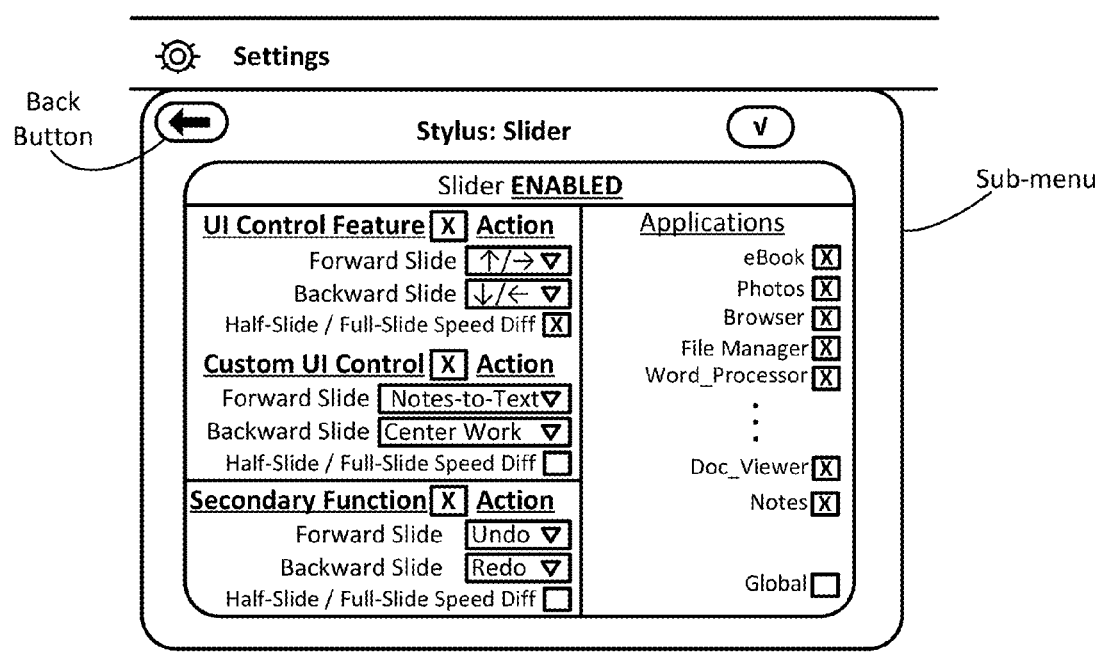

In one particular embodiment, a stylus control feature action configuration sub-menu, such as the one shown in FIG. 1e, may be accessed by selecting the Settings option in the quick navigation menu, which causes the device to display the general sub-menu shown in FIG. 1d. From this general sub-menu, the user can select any one of a number of options, including one designated. Stylus in this specific example case. Selecting this sub-menu item may cause the configuration sub-menu of FIG. 1e to be displayed, in accordance with an embodiment. In other example embodiments, selecting the Stylus option may present the user with a number of additional sub-options, one of which may include a so-called "stylus slider action" option, which may then be selected, by the user so as to cause the stylus slider configuration sub-menu of FIG. 1e to be displayed. Any number of such menu schemes and nested hierarchies can be used, as will be appreciated in light of this disclosure. In other embodiments, the stylus control feature action function can be hard-coded such that no configuration sub-menus are needed or otherwise provided (e.g., slider action while sufficiently proximate the device for carrying out actions as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch (e.g., finger or stylus) in a given location into an electrical signal which is then received and processed by the underlying operating system (OS) and circuitry (processor, etc). Additional example details of the underlying OS and circuitry in accordance with some embodiments will be discussed in turn with reference to FIG. 2a.

The stylus detection surface (or stylus detection display, in this example case) can be any surface that is configured with stylus-detecting technologies capable of contact and/or non-contact (hovering) detection, whether capacitive, resistive, acoustic, active-stylus, and/or other input detecting technology. The screen display can be layered above input sensors, such as a capacitive sensor grid for passive touch-based input such as with a finger or passive stylus in the case of a so-called in-plane switching (IPS) panel, or an electromagnetic resonance (EMR) sensor grid. In some embodiments, the stylus detection display can be configured with a purely capacitive sensor, while in other embodiments the touch screen display may be configured to provide a hybrid mode that allows for both capacitive input and EMR input, for example. In still other embodiments, the stylus detection surface is configured with only an active-stylus sensor. Numerous touch screen display configurations can be implemented using any number of known or proprietary screen based input detecting technologies. In any such embodiments, a stylus detection surface controller may be configured to selectively scan the stylus detection surface and/or selectively report stylus inputs detected proximate to (e.g., within a few centimeters, or otherwise sufficiently close so as to allow detection) the stylus detection surface.

In one example embodiment, an stylus input can be provided by the stylus hovering some distance above the stylus detection display surface (e.g., one to a few centimeters above the surface, or even farther, depending on the sensing technology deployed in the stylus detection surface), but nonetheless triggering, a response at the device just as if direct contact were provided directly on the stylus detection display. As will be appreciated in light of this disclosure, a stylus as used herein may be implemented with any number of stylus technologies, such as a DuoSense® pen by N-trig® (e.g., wherein the stylus utilizes a touch sensor grid of a touch screen display) or EMR-based pens by Wacom technology, or any other commercially available or proprietary stylus technology. Further recall that the stylus sensor in the computing device may be distinct from an also provisioned touch sensor grid, in the computing device. Having the touch sensor grid separate from the stylus sensor grid allows the device to, for example, only scan for a stylus input, a touch contact, or to scan specific areas for specific input sources, in accordance with some embodiments. In one such embodiment, the stylus sensor grid includes a network of antenna coils that create a magnetic field which powers a resonant circuit within the stylus, in such an example, the stylus may be powered by energy from the antenna coils in the device and the stylus may return the magnetic signal back to the device, thus communicating the stylus' location above the device, angle of inclination, speed of movement, and control feature activation (e.g., slide switch action). Such an embodiment also eliminates the need for a battery on the stylus because the stylus can be powered by the antenna coils of the device (assuming no active stylus componentry). In one particular example, the stylus sensor grid includes more than one set of antenna coils. In such an example embodiment, one set of antenna coils may be used to merely detect the presence of a hovering or otherwise sufficiently proximate stylus, while another set of coils determines with more precision the stylus' location above the device and can track the stylus' movements.

As previously explained, and with further reference to FIGS. 1d and 1e, once the Settings sub-menu is displayed (FIG. 1d), the user can then select the Stylus option. In response to such a selection, the stylus slider action configuration sub-menu shown in FIG. 1e can be provided to the user. The user can configure a number of functions with respect to the stylus slider action function, in this example embodiment. For instance, in this example case, the configuration sub-menu includes a UI check box that when checked or otherwise selected by the user, effectively enables the stylus slider action mode (shown in the enabled state); unchecking the box disables the mode. Other embodiments may have the stylus slider action mode always enabled (e.g., by default or hard-coded), or enabled by a physical switch or button located on either the device or the stylus, for example. In addition, once the slider action mode is enabled in this example embodiment, the user can associate a number of functions with specific slider control using drop down menus, as variously shown in FIG. 1e. As can be further seen in this example embodiment, there are three main types of functions/actions that can be configured: UI Control Feature actions, Custom UI Control actions, and Secondary Function actions.

If the UI Control Feature check box is checked, the user can use the slider function to operate on various UL control features currently displayed or otherwise relevant to current device performance, and particularly a given UI control feature to which the stylus is pointing. For instance, the slider function can be engaged to change variables or tool features such as volume (e.g., if the stylus is touching or otherwise pointing at a displayed UI volume control feature, or a playback application is playing music or a video, then slider action corresponds to volume control), font size or type (e.g., if the stylus is touching or otherwise pointing at a displayed UI font control feature, or a portion of text is selected on screen, then slider action corresponds to font control), color (e.g., if the stylus is touching or otherwise pointing at a displayed UI color control feature, then slider action corresponds to color control), line thickness or color (e.g., if the stylus is touching or otherwise pointing at a displayed UI line control feature, then slider action corresponds to line control), margin size (e.g., if the stylus is touching or otherwise pointing at a displayed UI margin control feature, then slider action corresponds to margin control), zoom (e.g., if the stylus is touching or otherwise pointing at a displayed UI zoom control feature, then slider action corresponds to zoom control), painting or drawing tool (e.g., if the stylus is touching or otherwise pointing at a displayed UI painting/drawing tool control feature, then slider action corresponds to changing that particular tool's configuration with respect to line width or color, for instance), switching tools within an active application if a drawing or note taking application is running and no tool is yet selected, or if the stylus is touching or otherwise pointing at a displayed UI tool box control feature, then slider action corresponds to selecting or otherwise changing to a desired tool), and other such variables. As will be appreciated in light of this disclosure, the computing device with which the stylus is interacting may display menus in response to slider action, which can be navigated using further slider action or other user input types (e.g., direct touch with finger, etc). In any such cases, the user can assign a given function to both forward and backward slider actions using the pull-down menus. In the example shown, for instance, a forward slide will either increase a value or scroll forward and a backward side will either decrease a value or scroll backward, depending on the target UI control feature. Further note in this example embodiment that the user may also check the 'Half-Slide/Full-Slide Speed Diff' check box to allow for both half-slides and full-slides in either the forward or backward directions, thereby allowing for at least four different slide types (e.g., full-slide forward, half-slide forward, full-slide backward, half-slide backward) that can be recognized by the computing device. Such a configuration could be used, for instance, to allow the rate of the desired function to be carried out faster (or slower, as the ease may be) if so desired. For instance, a half-slide backward could be used to decrease volume at a first speed and full-slide backward would decrease volume 10× faster. Other functions amenable to multi rate implementation will be apparent in light of this disclosure (e.g., page turning, scrolling, zoom). If the box is not checked, then intermediate slide positions can be treated the same a full-slide positions, for example.

If the Custom UI Control check box is checked, the user can use the slider function to perform some pre-selected or assigned task, which may depend, for example, upon the active application or context currently active on the computing device. For instance, in the example shown, if a note taking application is active and the user has taken notes therein, a forward slider action will cause the notes to be converted to a text file. In another example, if an application is active where the currently displayed work or content can be centered on the screen (e.g., artwork or any content with a designated center point), a backward slider action will cause that displayed work or content to centered on the screen. Further note in this example embodiment that the user may also check the 'Half-Slide/Full-Slide Speed Diff' check box to allow for both half-slides and full-slides in either the forward or backward directions, thereby allowing for at least four different slide types as previously described. As previously explained, the slide distance can be used as a speed differential. However, in other embodiments, it can be used to allow for numerous slide combinations and corresponding assigned functions. For instance, note that some functions may be associated with multiple slider actions. For example,

TABLE 1

Example Custom UI Control Actions

| Application/Context | Slider Actions | Function |
|---|---|---|
| Paint/Drawing App | full-slide forward, home full-slide forward, home | Select line width for given tool |
| Paint/Drawing App | half-slide forward, home half-slide forward, home | Select color for given tool |
| Audio Note Taking App | full-slide forward, home full-slide backward, home | Record |
| Audio Note Taking App | half-slide forward, home | Pause/Hold |
| Audio Note Taking App | half-slide backward, home | Release Pause/Hold |
| Audio Note Taking App | full-slide backward, home full-slide backward, home | Save audio file to folder |
| Note Taking App | full-slide forward, home | Use pencil tool |
| Note Taking App | full-slide forward, home full-slide forward, home | Use highlighter tool |
| Note Taking App | full-slide forward, home full-slide forward, home full-slide forward, home | Use eraser tool |
| Note Taking App | fill-slide backward, home | Change color of tool |
| Note Taking App | full-slide backward, home full-slide backward, home | Change line thickness of tool |
| Note Taking App | full-slide forward, home full-slide backward, home half-slide forward, home | Convert notes to text file and save to folder |
| Global/Launch App | full-slide forward, home full-slide forward, home full-slide forward, home | Launch Browser App |

TABLE 1-continued

Example Custom UI Control Actions

| Application/Context | Slider Actions | Function |
|---|---|---|
| Global/Launch App | full-slide forward, home full-slide forward, home full-slide forward, home full-slide forward, home | Launch Text Messaging App |
| Global/Launch App | full-slide backward, home full-slide backward, home full-slide backward, home full-slide backward, home | Launch Music Search and Identification App |

Table 1 shows some example slider actions and corresponding functions if the Custom UI Control check box is not checked, then intermediate slide positions can be treated the same a full-slide positions for example.

Note that in some embodiments where a combination of slider actions is used for a given function, that there may be a time period in which the overall slider action must be completed to be treated as a single action. To this end, the processor (either in the stylus or the computing device) that receives signals that correspond to each slider action can execute a timing function to detect combination slider actions. For instance, as long as each sequential slider action commences within 2 seconds of the previous slider action ending, then that group of slider actions will be treated as a single slider action that corresponds to a single function. On the other hand, if more than 2 seconds has elapsed from the end of one slide action to the beginning of the next slider action, then those slider actions will be treated as two separate actions that may correspond to two separate functions. Further note that similar functionality can be applied to other stylus control features, such as a multiple stylus push-button presses used to represent a single action that corresponds to a single function, or multiple taps/gesture on a stylus-based, touch-sensitive surface to represent a single action that corresponds to a single function, or multiple squeezes on a stylus-based pressure-sensitive control feature to represent a single action that corresponds to a single function.

If the Secondary Functions check box is checked, the user can use the slider function to perform some pre-selected or assigned task, which is more global in nature and does not necessarily depend upon the content currently displayed or the currently active application or context of the computing device. With such Secondary Functions, further note that the stylus need not be pointing in any particular direction or at any particular content, but merely needs to be within an acceptable distance for its control feature actions to be detected by the stylus detection surface of the computing device. As previously explained, the user may also check the 'Half-Slide/Full-Slide Speed Diff' check box to allow for both half-slides and full-slides in either the forward or backward directions, thereby allowing for at least four different slide types which can be used to provide various multi-slide combinations (and the various corresponding functions). Examples of Secondary Functions include, select content/icon, run application, cut, copy, delete, undo, redo, next page, zoom in/out, adjust font size, adjust brightness, adjust volume, switch tool or application, skip scene, create a note (on device), or start an audio or video recording of a classroom lecture or other event (from device or stylus if stylus is configured to record/store sounds/video). Further examples of Secondary Functions include, half-slide for next page/previous page; fall-slide for next chapter/previous chapter; sliding in one direction to cut or copy; sliding in another direction to paste the selected text; and the like.

Thus, and as will be appreciated in light of this application, slider action functions may be configured on a content-specific level, an application-specific level, or on a global level wherein the action performs the same function regardless of the application running or type of content currently displayed at the time, and regardless of whether content is selected or what the stylus is pointing at. Note that the top button of the stylus shown in FIG. 1c is may also be configured to perform functions as explained with reference to the slider. Numerous configurations will be apparent in light of this disclosure.

With further reference to the example embodiment of FIG. 1e, the user may also specify a number of applications in which the stylus slider action mode can be invoked. Such a configuration feature may be helpful, for instance, in a tablet or laptop or other multifunction computing device that can execute different applications (as opposed to a device that is more or less dedicated to a particular application). In this example case, the available applications are provided along with a corresponding check box, but could be a UI pull-down menu of some other suitable UI feature. Note the diverse nature of the example applications, including an eBook application, a photo viewing application, a browse application, a file manager application, a word processor, a document viewer, and a notes application, just to name a few examples. In this example case, a stylus slider action can be associated with, for example, the next page function when an eBook is running, with the zoom-in function when a photo viewing/editing application is running, with scrolling function when a browser application is running, with the open function when a file manager application is running, and with the dictionary look-up function when word processor application is running. In other embodiments, multiple stylus slider control features may be associated with distinct functions for different applications. In other embodiments, the slider action mode can be invoked whenever the stylus is activated, regardless of the application being used. If so desired, the Global check box can be checked, so that a common scheme of stylus-based slider functionality can be provisioned, which may be used in conjunction with an application based scheme or on its own, as so desired. Any number of applications or device functions may benefit from a stylus slider action mode (or other stylus control feature mode) as provided herein, whether user-configurable or not, and the claimed invention is not intended to be limited to any particular application or set of applications.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Numerous other configurable aspects will be apparent in light of this disclosure. Note that in some embodiments the various stylus actions may be visually demonstrated to the user as they are carried out via suitable function animations. Such animations may provide clarity to the function being performed, and in some embodiments the animations may be user-configurable while they may be hard-coded in other embodiments. Again, while FIGS. 1d and e show user configurability, other embodiments may not allow for any such configuration, wherein the various features provided are hard-coded or otherwise provisioned by default. The degree of hard-coding versus user-configurability can vary from one embodiment to the next, and the claimed invention is not intended, to be limited to any particular configuration scheme of any kind. In an embodiment where the function was hard-coded, there may be a help module that provides a cheat sheet that the user can readily access to learn the various interface functionalities that can be achieved using the stylus-based slider.

Figure 2A:
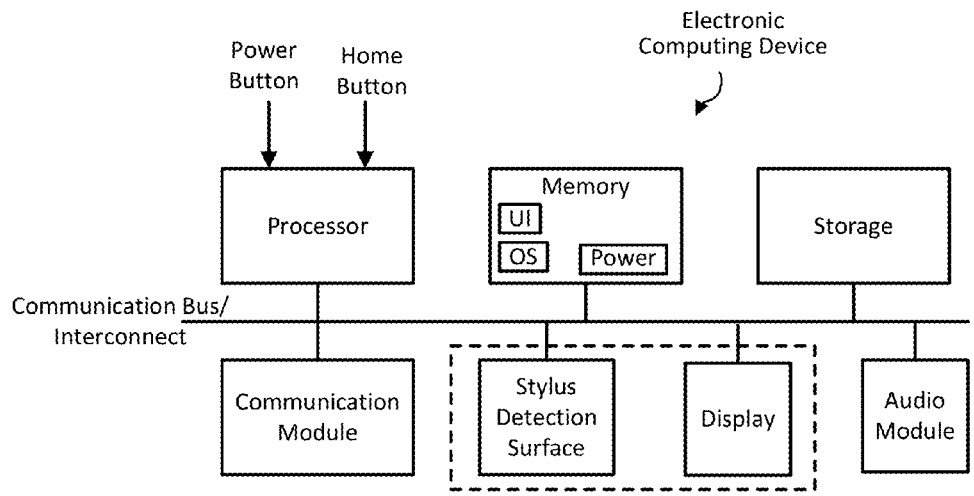
FIG. 2a illustrates a block diagram of an electronic computing device configured in accordance with an embodiment of the present invention.

FIG. 2a illustrates a block diagram of an electronic computing device with a stylus sensitive display, configured in accordance with an embodiment of the present invention. As can be seen, this example device includes a processor, memory (e.g., RAM and/or ROM for processor workspace and storage), additional storage/memory (e.g., for content), a communications module, a display, a stylus detection surface, and an audio module. A communications bus and interconnect is also provided to allow inter-device communication. Other typical componentry and functionality not reflected in the block diagram will be apparent (e.g., battery, co-processor, etc.). Further note that in some embodiments the stylus detection surface may be integrated into the device display. Alternatively, the stylus detection surface may be a track pad, a housing configured with one or mare acoustic sensors, a separate stylus-sensitive surface that may be connected to the device via cables or a wireless link, etc. As discussed above, the stylus detection surface may employ any suitable input detection technology that is capable of translating an action of a stylus touching or otherwise being sufficiently proximate to the surface into an electronic signal that can be manipulated or otherwise used to trigger a specific user interface action, such as those provided herein. The principles provided herein equally apply to any such stylus-sensitive devices. For ease of description, examples are provided with stylus-sensitive displays.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language C, C++ objective C, JavaScript, custom or proprietary instruction sets, etc), and encoded on a machine readable medium, that when executed by the processor and/or co-processors), carries out the functionality of the device including a UI having a stylus-based slider action function as described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 6-inch. E-ink Pearl 800×600 pixel screen with Neonode® ZForce® touch screen, or any other suitable display and touch screen interface technology. The communications module can be configured to execute, for instance, any suitable protocol which allows for connection to the stylus so that stylus-based slider actions may be detected by the device, or to otherwise provide a communication link between the device and the stylus or other external systems. Note in some cases that slider actions of the stylus are communicated to the device by virtue of the stylus detection surface and not the communication module. In this sense, the communication module may be optional. Example communications modules may include an NFC (near field connection), Bluetooth, 802.11 b/g/n WLAN, or other suitable chip or chip set that allows for wireless connection to the stylus (including any custom or proprietary protocols). In some embodiments, a wired connection can be used between the stylus and device. In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured, for example, to automatically transition the device to a low power consumption or sleep mode after a period of non-use. A wake-up from that sleep mode can be achieved, for example, by a physical button press and/or a stylus-based slider action, a touch screen swipe or other action. The user interface (UI) module can be programmed or otherwise configured, for example, to carryout user interface functionality, including that functionality based on stylus action detection as discussed herein and the various example screen shots shown in FIGS. 1a, 1d-e, 4a-c, and 5a-c, in conjunction with the stylus-based methodologies demonstrated in FIG. 6, which will be discussed in turn. The audio module can be configured, for example, to speak or otherwise aurally present a selected eBook table of contents or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display (sensitive to stylus input) is provided, other embodiments may include a non-touch screen and a touch-sensitive surface such as a track pad, or a touch-sensitive housing configured with one or more acoustic sensors, etc.

Figure 2B:
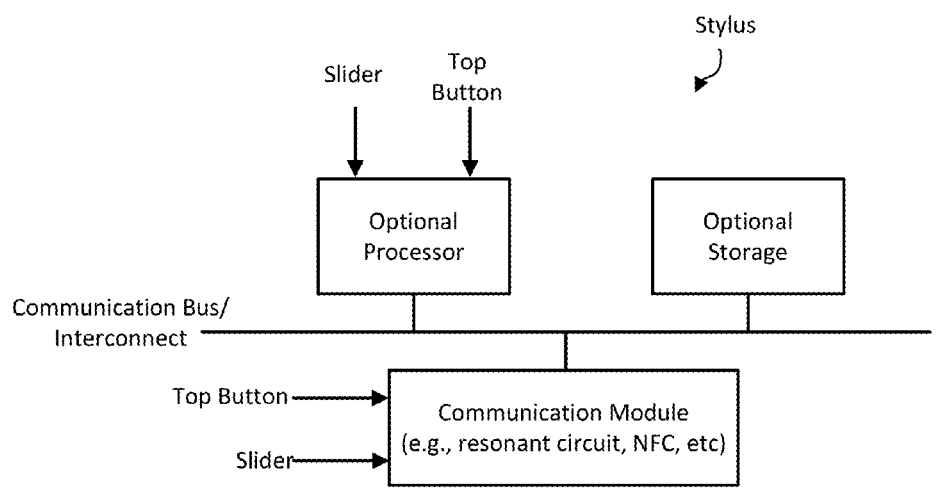
FIG. 2b illustrates a block diagram of a stylus configured in accordance with an embodiment of the present invention.

FIG. 2b illustrates a block diagram of a stylus configured in accordance with an embodiment of the present invention. As can be seen, this example stylus includes a storage/memory and a communication module. A communications bus and interconnect may be provided to allow inter-device communication. An optional processor may also be included in the stylus to provide local intelligence, but such is not necessary in embodiments where the electronic computing device with which the stylus is communicatively coupled provides the requisite control and direction. Other componentry and functionality not reflected in the block diagram will be apparent (e.g., battery, speaker, antenna, etc). The optional processor can be any suitable processor and may be programmed or otherwise configured to assist in controlling the stylus, and may receive input from the user from control features including a top push-button and slider, in this example case. The processor can also have a direct connection to a battery. The storage may be implemented with any suitable memory and size (e.g., 2 to 4 GBytes of flash memory). In other example embodiments storage/memory on the stylus itself may not be necessary.

The communications module can be, for instance, any suitable module which allows for connection to a nearby electronic device so that information may be passed between the device and the stylus. Example communication modules may include an NFC, Bluetooth, 802.11 b/g/n WLAN, or other suitable chip or chip set which allows for connection to the electronic device. In other embodiments, the communication module of the stylus may implement EMR or other similar technologies that can communicate stylus information to a device, including stylus location and whether a stylus action has been performed, without a separate communications chip or chip set. In one such example, the stylus may include a communication module comprising a resonator circuit that may be manipulated using the various control features of the stylus, such as the slider and/or push-button. In such an example, performing slider actions with the stylus may be accomplished by using the slider to adjust the resonant frequency of the resonator circuit. The altered resonant frequency may be detected by the stylus detection surface of the device, thus triggering a response at the device. Note in such a case that a separate dedicated communication module (e.g., Bluetooth, NFC, etc) may be optional, as previously explained. Further note that such a resonator circuit can be passive, and therefore not require any battery or power source to operate.

In another example case the stylus may include a processor and a communication module arrangement that can receive input from the various control features of the stylus, such as the slider and push-buttons. In certain such embodiments, the stylus further comprises an independent power source (e.g. a battery). The slider or button action generates conditions (e.g., changes in capacitance) that can be translated into signals that the processor can then interpret and then direct the communication module (e.g. a transceiver) to send a corresponding control signal back to the device to implement the corresponding action on the device. In some such cases, the stylus may also include a resonator circuit to facilitate interaction with the stylus detection surface as previously explained.

In another example case, the communications module may receive input directly from the user from control features including the slider and topside button, wherein such inputs can be used to enable a corresponding control signal to be sent by the communications module. As will be appreciated, commands may be communicated and/or target content may be transferred between copied or cut or pasted)

the stylus and the electronic device over a communication link. In one embodiment, the stylus includes memory storage and a transceiver, but no dedicated processor. In such an embodiment, the transceiver of the electronic device communicates with the stylus-based transceiver and the processor of the electronic device can then perform the various functions based on information received from the device-based transceiver. In this way, stylus-based user input can be used to control the device.

Figure 2C:
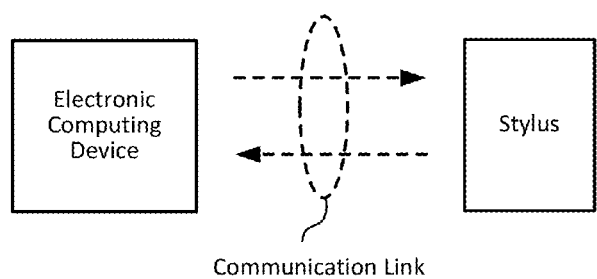
FIG. 2c illustrates a block diagram of a communication link between the computing device of FIG. 2a and the stylus of FIG. 2b, configured in accordance with an embodiment of the present invention.

FIG. 2c illustrates a block diagram showing a communication link between the electronic computing device of FIG. 2a and the stylus of FIG. 2b, according to one embodiment of the present invention. As can be seen, the system generally includes an electronic computing device that is capable of wirelessly connecting to other devices and a stylus that is also capable of wirelessly connecting to other devices. In this example embodiment, the electronic computing device may be, for example, an e-Book reader, a mobile cell phone, a laptop, a tablet, desktop, or any other stylus-sensitive computing device. As described above, the communication link may include an NFC, Bluetooth, 802.11b/g/n WLAN, electro-magnetic resonance, and/or other suitable communication link which allows for communication between one or more electronic devices and a stylus. In some embodiments, EMR technology may be implemented along with one or more of NFC, Bluetooth, 802.11 b/g/n WLAN, etc. In one such example, EMR may be used to power a stylus and track its location above a device while NFC may enable data transfer between the stylus and the device. In some embodiments, the stylus may be configured in real-time over the communication link. In one such example, the user may adjust stylus configuration settings using the various menus and sub-menus such as those described in FIGS. 1d-e and the stylus may be reconfigured in real-time over the communication link.

Example Stylus-Based Slider Actions

Figure 3A:
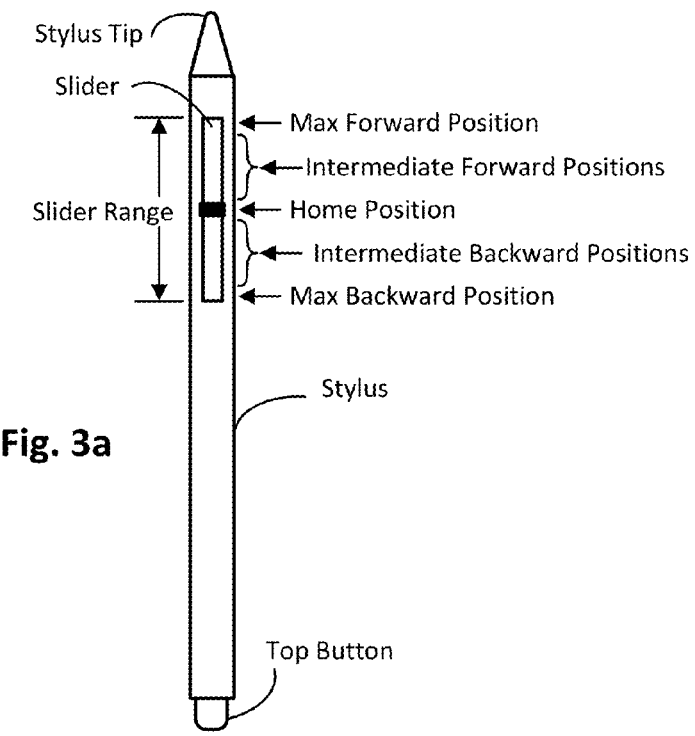
FIGS. 3a-c illustrate an example stylus configured with a slider control feature and for use with an electronic computing device, in accordance with an embodiment of the present invention.
Figure 3B:
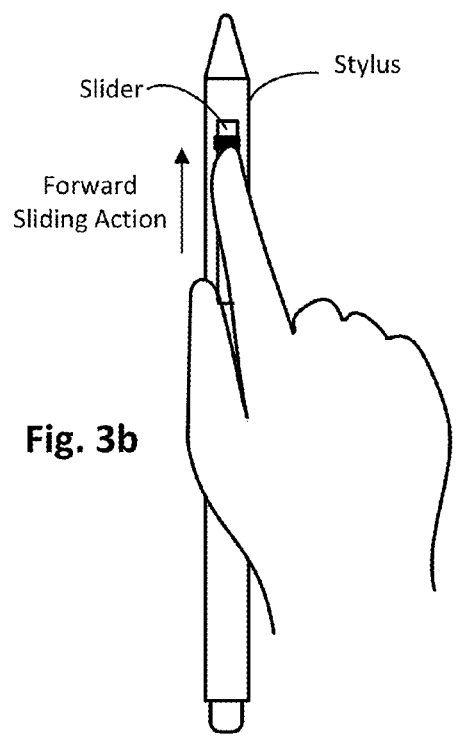
Figure 3C:
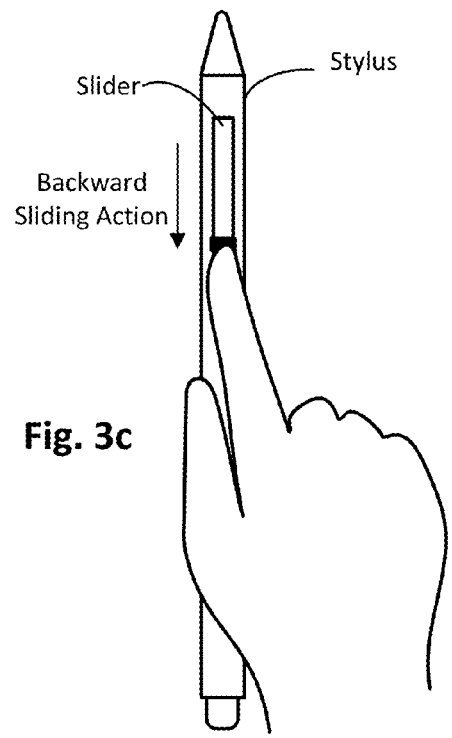

FIGS. 3a-c illustrate an example stylus configured with a slider control feature and for use with an electronic computing device, in accordance with an embodiment of the present invention. As can be seen, in this particular configuration, the stylus comprises a stylus tip used to interact with the stylus detection surface (by either direct contact or sufficiently proximate indirect contact) and control features including a top button and a slider along the shaft of the stylus. The previous discussion with respect to features such as stylus form factor and materials provided with reference to FIG. 1c is equally applicable here. As can be further seen with reference to FIG. 3a, the slider control feature may slide over a range from a maximum forward position to a maximum backward position, and is biased to return to a middle, or home, position. Any number of intermediate slider positions may be provided as well, and in both the forward and backward directions. FIG. 3b shows a user engaging the slider with a forward sliding action, and FIG. 3c shows a user engaging the slider with a backward sliding, action.

Figure 4A:
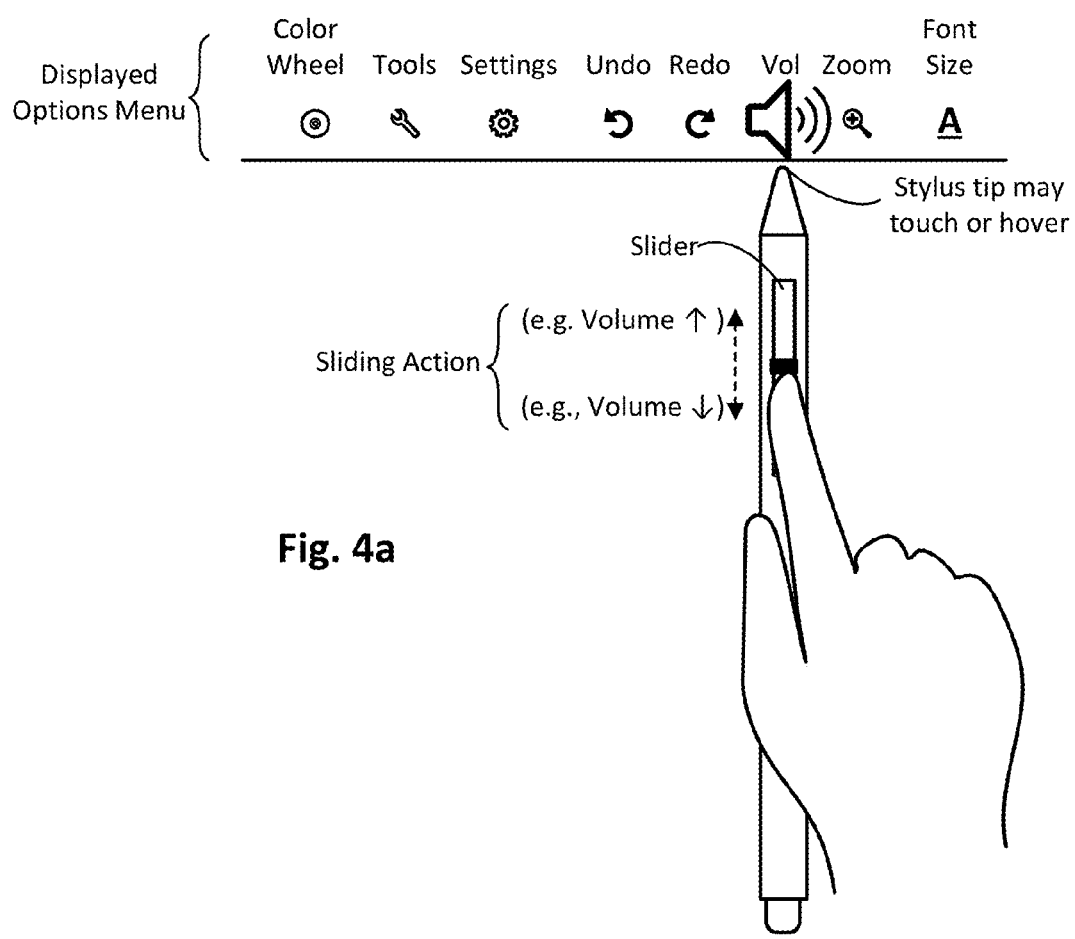
FIGS. 4a-c illustrate example use cases for a stylus configured with a slider control feature and for interacting with an electronic computing device, in accordance with an embodiment of the present invention.

FIG. 4a illustrates an example use case for a stylus configured with a slider control feature and for interacting with an electronic computing device, in accordance with an embodiment of the present invention in this example case, the stylus is being used to interact with a options menu that is currently displayed on the computing device with which the stylus is communicatively paired. As can be seen, the options menu includes a number of icons or UI control features with which the user can interact, including a Color Wheel, a Tools menu, a Settings menu, an Undo function, a Redo function, a Volume control feature, a zoom function, and a font size control feature, in this example case, the user is pointing the stylus at the volume icon, and is adjusting the volume of the device using the stylus-based slider. Depending on the specific slider action used, the volume can be raised or lowered. Note the user may be touching the volume icon directly, or may be hovering over the volume icon to carry out this volume control action. As previously explained, note that the volume icon may manifest some indication so that the user knows that the stylus control action will be directed to that particular icon function. For instance, in this example embodiment, the volume icon is amplified in size relative to the other icons (e.g., like it is being looked at under a magnifying glass), so that it is evident to the user that whatever stylus-based action is executed, it will be associated with the volume function.

Figure 4B:
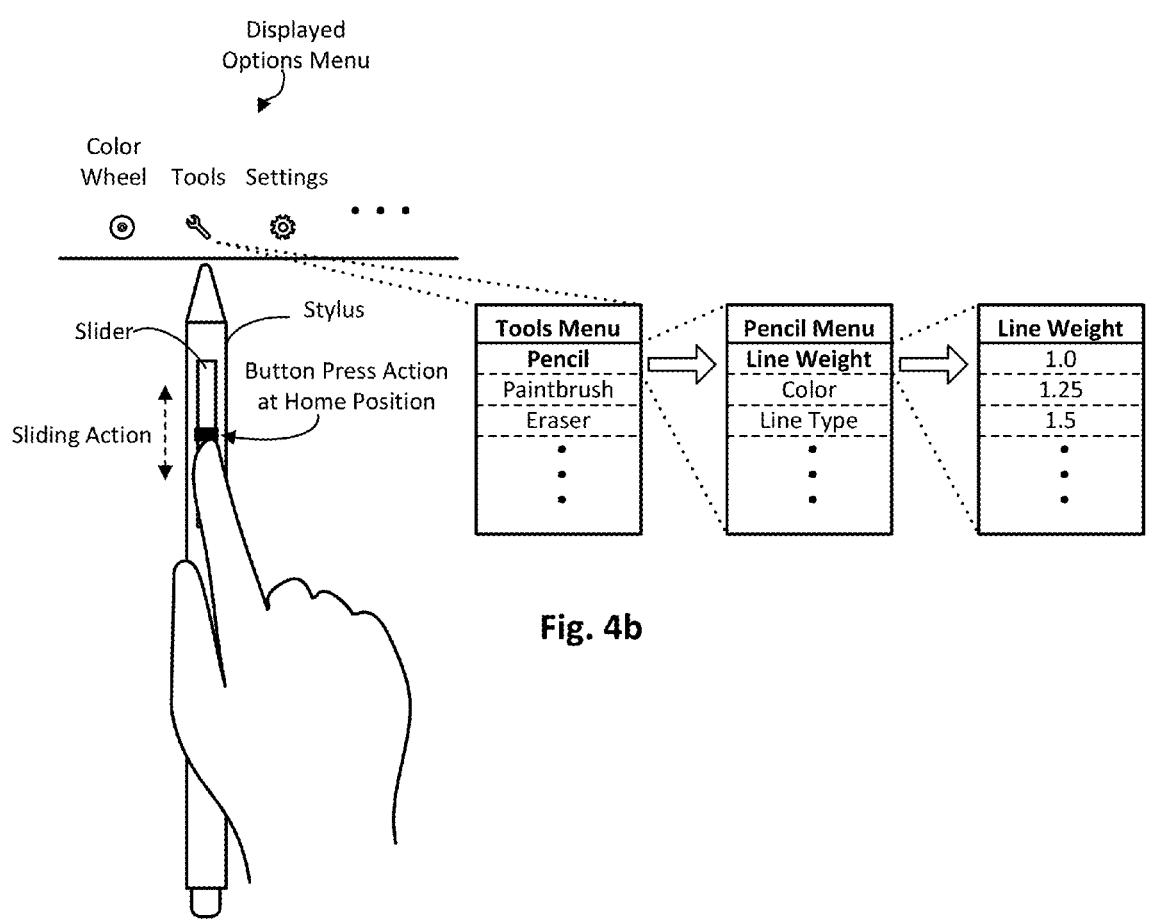

FIG. 4b illustrates another example use case for a stylus configured with a slider control feature and for interacting with an electronic computing device, in accordance with an embodiment of the present invention. In this example case, the stylus is being used to interact with a Tools menu that is currently displayed on the computing device with which the stylus is communicatively paired. As can be further seen, the stylus of this example embodiment includes a slider that is also configured with a button press action when the slider is at its home position. Such a feature can be used, for instance, to select icons or menu items to which the stylus is pointing or otherwise navigating, in the example shown, the stylus has been used to select the Tools menu (by a button-press at home position of the slider, or just by virtue of the stylus pointing at the menu), which causes the Tools menu to pop-up on the display screen of the computing device. Once the Tools menu is on screen, the user can then use the stylus slider feature to navigate the menu. In this example case, the user has chosen Pencil in the Tools menu (using the slider action and/or button-press actions of the slider, or just by pointing the stylus accordingly, or by a combination of pointing and sliding), which causes a Pencil sub-menu to pop-up on the display screen of the computing device. Once the Pencil sub-menu is on screen, the user can then use the stylus slider feature to navigate the Pencil sub-menu and select the Pencil feature that is to be adjusted. In this example case, the user selects the Line Weight feature (using the slider action and/or button-press actions of the slider, or just by pointing the stylus accordingly, or by a combination of pointing and sliding), which causes a. Line Weight sub-menu to pop-up on the display screen of the computing device. Now the user can select a desired line weight, and commence to the use Pencil tool as desired. As previously explained, graphical animations or other indicators (e.g., differing chimes or vibrations as the menu is parsed) can be used to inform the user as to what icon or menu item the stylus is currently engaging to assist in the user selection process.

Figure 4C:
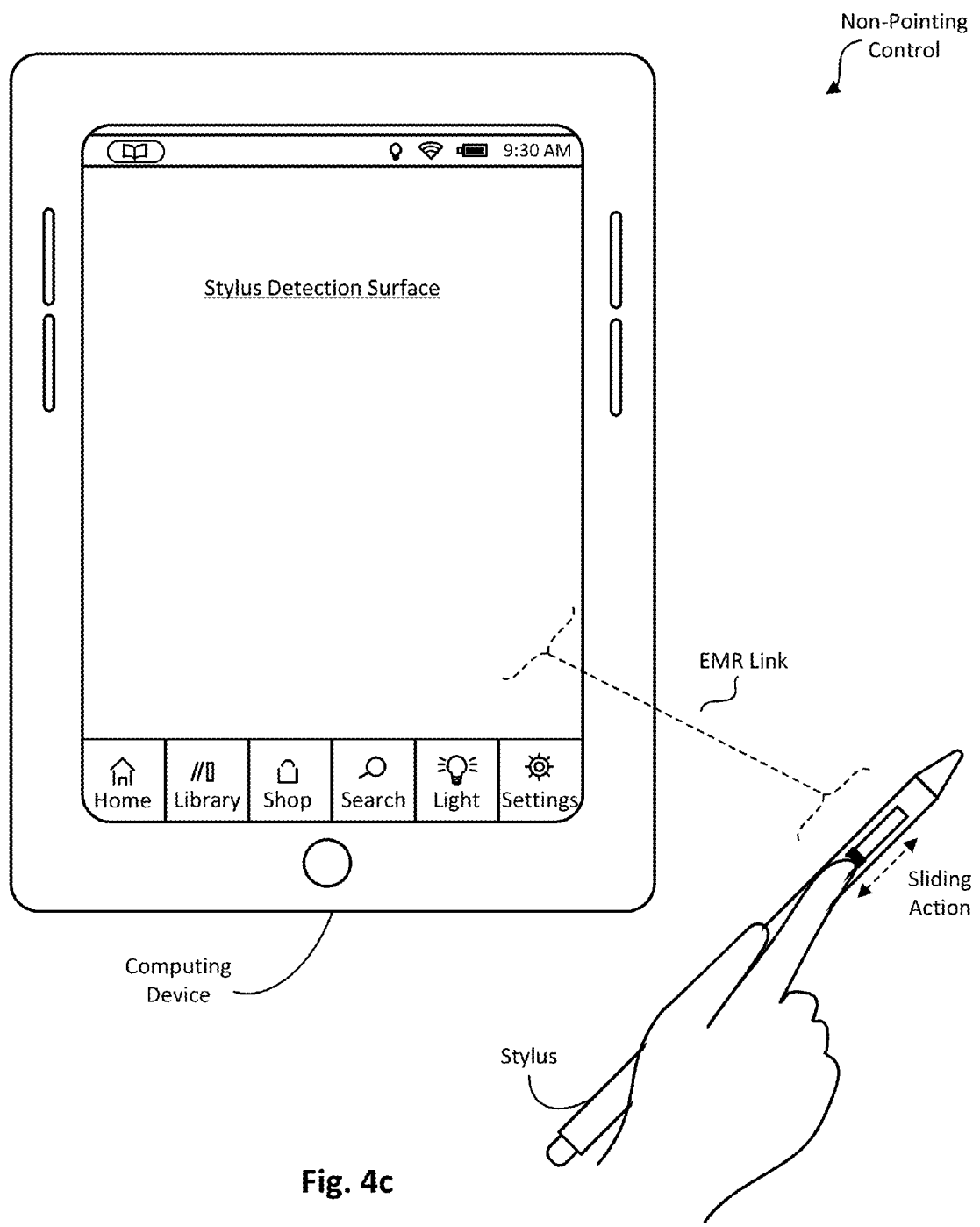

FIG. 4c illustrates to the example use case for a stylus configured with a slider control feature and for interacting with an electronic computing device, in accordance with an embodiment of the present invention. In this example case, the stylus is being used to interact with the computing device but without actually pointing at or otherwise selecting anything currently being displayed. As can be further seen, the stylus-based slider action is communicated to the device via an EMR link in this example case (although other suitable communication links will be apparent in light of this disclosure). Recall, that the slider in such cases can be used to manipulate a resonant circuit of the stylus, which in turn can be detected by an antenna-based, stylus detection surface of the device. Thus, for instance, the user may be enjoying an eBook on the device, or may be attending a lecture that includes presentation slides or other education materials that the user is viewing on screen as she/he follows along with the lecture. When appropriate, the user can engage the slider to go to the next page of the book/presentation/etc. Forward slider actions can be used to page forward, and backward slider actions can page backward. Holding a forward or backward slide position for more than 2 seconds can be used to cause an accelerated paging rate in the corresponding direction. Word selections made with the stylus (e.g., by direct touch or hovering over that word) combined with a subsequent non-pointing stylus slide switch action can be used to launch a dictionary look-up or cause a knowledge information database to be accessed to provide more information about the selected word. Any number of such non-pointing stylus slide switch actions can be configured, as will be apparent in light of this disclosure.

Slider Control Feature

Figure 5A:
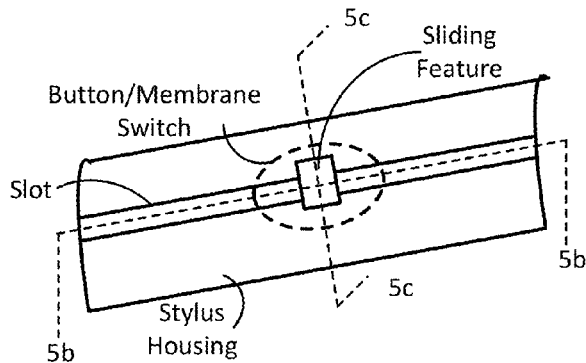
FIGS. 5a-c illustrate partial views and circuitry of a stylus-based slider control feature configured in accordance with an embodiment of the present invention.
Figure 5B:
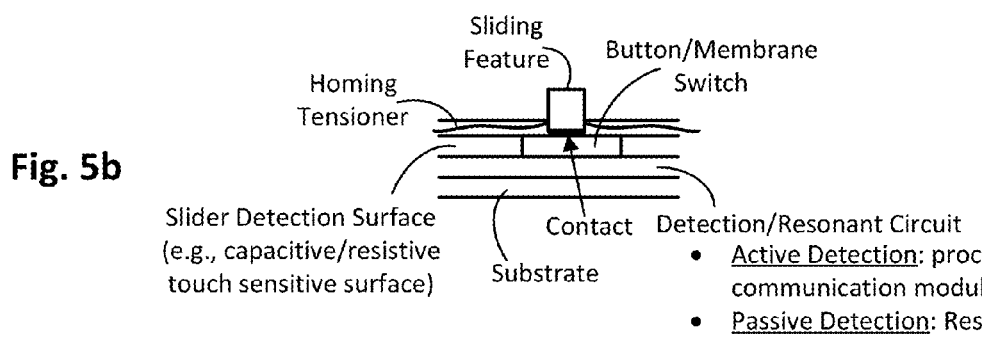
Figure 5B:
Figure 5C:
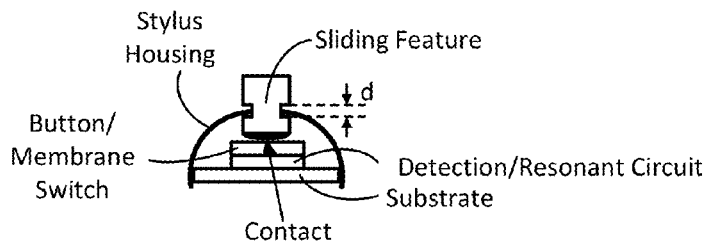

FIGS. 5a-c illustrate partial views and circuitry of a stylus-based slider control feature configured in accordance with an embodiment of the present invention. As can be seen in FIG. 5a, the housing of the stylus includes a slot through which the sliding feature can slide. The sliding range can be set by the slot length. The housing and sliding feature can be implemented with any suitable material, such as plastic, metal, wood, etc.

FIG. 5b shows a longitudinal cross-section taken across the stylus body length as indicated by the dashed 5b-5b line of FIG. 5a. As can be seen in this cross-section, the sliding feature is operatively coupled with two homing tensioners that can be fastened at either end of the sliding range or otherwise with the stylus housing. These tensioners, which can be implemented for instance with elastic or other suitable material, are configured to keep the sliding feature at its home position when it is not being manipulated by the user, but also allow for movement along the complete sliding range in either direction. In this example case, the home position also happens to be above a membrane switch included, in the slider detection surface to accommodate a press-button-like action at the home position.

As can be further seen, the stylus includes a substrate upon which a detection/resonant circuit is provided, which may be passive or active in nature. In one example passive embodiment, this circuit includes a resonant circuit configured to resonate at a given frequency (in response to RF energy emitted by the stylus detection surface of the computing device) depending on the overall capacitance of the circuit, which can be affected by sliding action of the sliding feature on the slider detection surface (which can be, for example, a capacitive or resistive touch-sensitive surface that registers the contact of the slider feature. In an example active embodiment this circuit includes a processor, communication module, and power source (e.g., battery), wherein the processor can receive detection signals from the slider detection surface (also coupled to the power source) and provide a corresponding command signal to the communication module for transmission to the computing device, which could then process the command signal. In other active embodiments with no processor, the detection signal can be provided directly to the communication module which would then transmit that detection signal to the computing device, which could then process the various distinct detection signals accordingly. Note that an active embodiment may also include the passive resonant circuit (hybrid of active and passive) which can also passively interact with the stylus detection surface of the computing device as previously explained (e.g., for purposes of detecting proximity and location of stylus, etc). The touch-sensitive area of the slider detection surface can be operatively coupled to the underlying detection circuit via any suitable interconnect capable of providing detection signals (whether passive or active) to the detection/resonant circuit. The substrate can be implemented with any suitable material (e.g., plastic, ceramic, glass, etc) capable of supporting the various circuit elements of the stylus (e.g., as discussed with reference to FIG. 2b).

FIG. 5b' shows an example resonant circuit that includes an inductor and a variable capacitor. As will be appreciated, a resonant circuit can be implemented with any number of passive components depending on factors such as the desired resonant frequency, and the example shown is not intended to limit the claimed invention to that particular example resonant circuit configuration. The capacitor is shown as variable to reflect that the overall capacitance of the circuit can be manipulated by the slider action, in accordance with some embodiments. For instance, the resonant circuit can have its capacitive value changed by, for example, sliding or button-pressing the slider feature, thereby causing a change in the capacitance and/or other variable element of that circuit. The contact of the sliding feature can be, for example, a conductive polymer or metal bead or rubber any other such material that causes the desired change in capacitance (and/or inductance and/or resistance) in the slider detection surface that can be detected by the underlying detection/resonant circuit, so that the stylus detection circuit of the computing device can sense the sliding action. As will be appreciated in light of this disclosure, each unique slider action can effectively provide a unique change to the resonant circuit, which in turn can be passively or actively sensed by the stylus detection circuit of the computing device as a unique signature of that particular stylus-based slider action. In a similar fashion, when the user performs a button-press at the home slider position, the underlying detection/resonant circuit again changes in response to that action. In more detail, and as can be further seen in FIG. 5b, the detection/resonant circuit may also include a button/membrane switch at the home position of the slider. Thus, when the user pushes the button/membrane switch, the underlying detection/resonant circuit again changes in response to that button-press, in a similar fashion to the sliding action. In particular, the button-press action will change the resonant frequency of the stylus tank circuit (detection/resonant circuit), which can then be picked up by a transmit/receive coil(s) of a digitizer included in the stylus detection surface of the computing device. This is the same effect used for individual buttons on the stylus, such as the push-button at the end of the stylus shown in FIG. 1c, in other embodiments, the stylus circuitry may be configured to actively detect sliding action (e.g., such as with a biased resistor divider network that changes in response to slider action, where an active detection signal is generated in response to slider action, and that active detection signal can then be processed and/or communicated to the computing device. Numerous such active or passive or hybrid (both active and passive) detection and communication schemes will be apparent in light of this disclosure, and the claimed invention is not intended to be limited to any particular configurations.

FIG. 5c shows a lateral cross-section taken across the stylus body as indicated by the dashed 5c-5c line of FIG. 5a. As can be seen in this cross-section, the contact of the sliding feature is in direct contact with the slider detection circuit, such that it can selectively engage the button membrane switch thereon (when at the home position) as well as the slider detection circuit (when sliding forward or backward). Further note that there is a degree of play between the sliding feature and the housing (as indicated by distance d), so as to allow for up-down action at the home position when the user wishes to engage the membrane switch. The distance d may vary depending on factors such as the elasticity of the materials used to form the contact and membrane switch as well as the pressure threshold for affirmatively engaging the membrane switch.

Methodology

Figure 6:
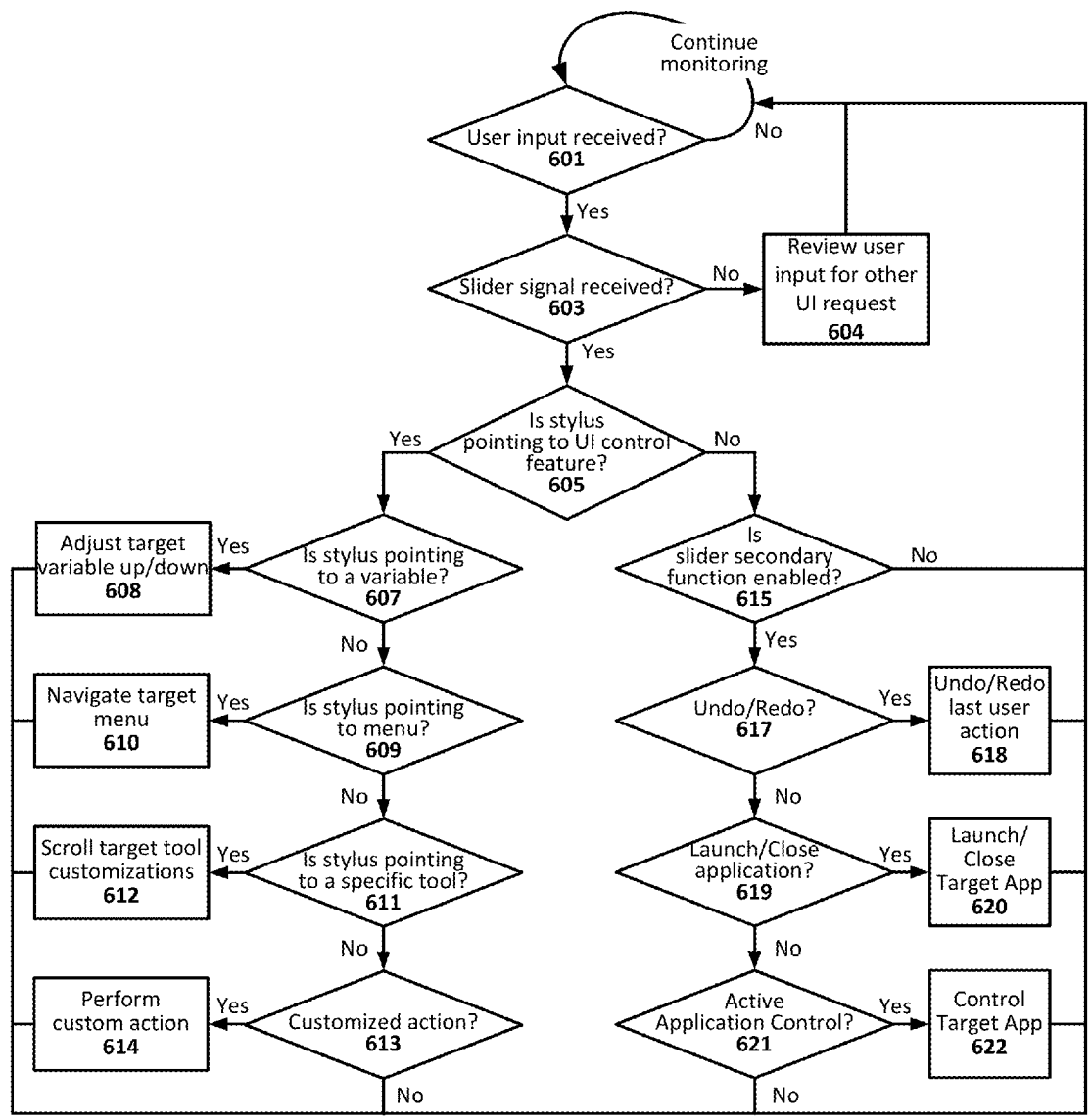
FIG. 6 illustrates a method for interacting with an electronic computing device using a stylus-based slider control feature, in accordance with an embodiment of the present invention.

FIG. 6 illustrates a method for interacting with an electronic computing device using a stylus-based slider control feature, in accordance with an embodiment of the present invention. This example methodology may be implemented, for instance, by the UI module of the electronic computing device shown in FIG. 2a. To this end, the UI module can be implemented in software, hardware, firmware, or any combination thereof, as will be appreciated in light of this disclosure. The various stylus-based slider actions may be communicated to the device over a communication link (e.g., EMR link, and/or dedicated communication link such as NFC or Bluetooth).

In general, any stylus sensitive surface may be used to detect the stylus touching, hovering over, or otherwise sufficiently proximate the device. As discussed above, EMR or other suitable technology may be implemented to detect the presence of a stylus directly or indirectly touching, (e.g., hovering over) a stylus-sensitive display, as well as to communicate stylus actions to the electronic device. In one particular example, EMR technology may be implemented to power and/or track a stylus touching or otherwise being sufficiently proximate to a stylus sensitive display. In one such example, a control feature action may be communicated from the stylus to the device by manipulating the resonant frequency of a resonant circuit within the stylus. As previously explained, this change in resonant frequency may be detected by the antenna coils of the stylus detection grid, thus triggering a response at the device, in accordance with some such embodiments. Various control features and/or control feature actions of the stylus may create different changes in resonant frequency, and thus may be assigned distinct functions. The stylus detection grid may track the location of the stylus, thus determining whether the stylus is pointing at selected content, a UI control feature or icon, a specific area of the stylus-sensitive display, etc. These main detections can be used in various ways to implement UI functionality.

In this example case, the method is used in conjunction with a stylus-based slider and includes determining 601 whether user input has been received, which may include input received when the stylus is hovering over or is otherwise sufficiently proximate to the stylus detection surface, or any other user input. In some embodiments, monitoring for stylus input includes monitoring all or part of a stylus-sensitive display screen. In general, the user input monitoring is effectively continuous, and once a user input has been detected, the method may continue with determining 603 whether a stylus-based slider signal has been received. If not, the method continues with reviewing 604 the user input for other UI requests (such as touch-based stylus input).

If, however, a stylus-based slider signal has been received, the method continues with determining 605 if the stylus is pointing to a UI control feature. If so, the method continues with determining 607 if the stylus is pointing to a variable (e.g., such as a UI control feature that can be manipulated to directly control a value such as volume, font size, line size, or any other such variables). If so, then the method continues with adjusting 608 the target variable up or down, depending on the slider action provided. If the stylus is not pointing to a variable, then the method continues with determining 609 if the stylus is pointing to a menu. If so, then the method continues with navigating 610 the target menu, depending on the slider action provided. In some cases, once the user has navigated to the choice of interest in a given menu, the user may select that choice, for example, by touching it with the stylus tip, or clicking a button on the stylus, or hovering over that menu item for more than 2 or 3 seconds. If the stylus is not pointing to a menu, then the method continues with determining 611 if the stylus is pointing to a specific tool. If so, then the method continues with scrolling or otherwise navigating 612 the target tool customizations, depending on the slider action provided. Just as with a menu item, once the user has navigated to a tool customization of interest, the user may select that choice with further appropriate stylus action. If the stylus is not pointing to a specific tool, then the method continues with determining 613 if a customized action should be performed. In some such cases, the custom action may have been configured by the user (as explained with reference to FIG. 1e, for example). Alternatively, the custom action may be some default action or an action that is otherwise hard-coded. In any case, if a customized action should be performed, then the method continues with performing 614 that action (e.g., which may be, for instance, converting hand-written notes currently on display to a text file, or converting an audio recording just taken by the device into a text file, or saving a project just created on screen into a file). If a customized action should not be performed, then the input can be ignored or otherwise reviewed for some other intended action as may be appropriate.

With further reference to the determination at 605, if the stylus is not pointing to a UI control feature, then the method continues with determining 615 if a slider-based secondary action should be performed. In some such cases, the secondary action may have been configured by the user (as explained with reference to FIG. 1e, for example). Alternatively, the secondary action may be some default action or an action that is otherwise hard-coded. In any case, if a secondary action should not be performed, then the input can be ignored or otherwise reviewed for some other intended action as may be appropriate. On the other hand, if a secondary action should be performed, then the method may continue with determining 617 if the secondary ac on is a redo or undo action. As will be appreciated in light of this disclosure, this determination may be guided by a previous user configuration or a hard-coded response, or may be based on the context of the current state of the computing device (e.g. based on whether or not the user currently editing or creating content). In any case, if an undo/redo action is requested, then the method continues with performing 618 that undo/redo action. If an undo/redo action is not requested, then the method may continue with determining 619 if the secondary action is a launch/close application action. If so, then the method continues with launching or closing 620 the application currently active on the device for the application that is otherwise designated). If a launch/dose application is not requested, then the method may continue with determining 621 if active application control is being requested. Again, this determination may be guided by a previous user configuration or a hard-coded response, or may be based on the context of the current state the computing device (e.g., if eBook is open, then turn page; if photo viewer is open, then go to next photo).

Numerous variations and embodiments will be apparent in light of this disclosure. One example embodiment of the present invention provides a system including, an electronic device having a display for displaying content to a user and a stylus detection surface for allowing user input via a stylus, and a user interface executable on the device and configured to perform a function in response to a stylus-based slider control feature input. In some cases, the function that is performed in response to the stylus-based slider control feature input is user-configurable. In some cases, the stylus detection surface comprises at least one set of antenna coils configured to detect changes in a resonant circuit within the stylus. In some such cases, the stylus detection surface includes a second set of antenna coils configured to detect at least one of location, speed of stylus movement, angle of stylus inclination and/or a change in resonant frequency of the resonant circuit within the stylus. In some cases, the system includes the stylus, wherein the stylus includes a slider control feature configured to provide the stylus-based slider control feature input. In some such cases including the stylus, manipulating the slider control feature creates a change in resonant frequency of a resonant circuit within the stylus. In some such other cases including the stylus, the stylus is configured to communicate with the electronic device over a wireless communication link. In some such cases, the stylus can be configured in real-time over the wireless communication link. In some cases, the slider control feature input comprises a combination of slider actions. In some cases, the function that is performed in response to the stylus-based slider control feature input is one of a plurality of functions that can be performed in response to specific stylus-based slider control feature input. In some cases, the electronic device is configured to provide at least one of an audio and/or visual notification associated with a function. In some cases, the function that is performed in response to the stylus-based slider control feature input is determined based on a stylus location over the stylus detection surface. In some cases, the display is a touch screen display and includes the stylus detection surface. In some cases, the electronic device is an eReader device or a tablet computer or a smartphone. In some cases, the function performed in response to a stylus-based slider control feature input includes at least one of adjusting a variable, executing a particular command, switching between tools, modifying a particular tool's settings, and/or launching an application.

Another example embodiment of the present invention provides a system including an electronic device having a display for displaying content to a user and a stylus detection surface for allowing user input, a stylus having a slider control feature (wherein the stylus is configured to communicate with the electronic device), and a user interface executable on the device and configured to perform a function in response to a stylus-based slider control feature input. In some cases, the slider control feature has a home position located between a maximum forward position and a maximum backward position, and the home position is the default position of the slider control feature.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to display content to a user via an electronic device having a stylus detection surface for allowing user input via a stylus, and perform a function in response to a stylus-based slider control feature input. In some cases, the function includes at least one of performing an undo action, performing a redo action, launching a note taking application, recording a sound and/or images, and/or switching from a first tool to a second tool. In some cases, the stylus detection surface is configured to detect a change in stylus resonant frequency caused by a stylus-based slider that provides the stylus-based slider control feature input.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for performing a function in response to receiving input from a stylus that includes an elongated body portion, a tip on an end of the elongated body portion, and a slider control feature on the elongated body portion, the system comprising:
    an electronic device having a display for displaying content and a stylus detection surface for allowing user input via at least one of direct and proximate contact from the stylus tip; and
    a user interface executable on the electronic device and configured to perform a function at the electronic device in response to input received from the stylus-based slider control feature, the input resulting from physical movement of the stylus-based slider control feature along a path that is parallel to a main axis of the elongated body portion of the stylus;
    wherein the user interface is configured to receive a first input in response to physical movement of the stylus-based slider control feature in a first direction away from a predetermined home position along the elongated body portion of the stylus, and the user interface is further configured to receive a second input different from the first input in response to physical movement of the stylus-based slider control feature in a second direction away from the predetermined home position, the second direction opposite the first direction, and
    wherein the user interface is configured to receive a third input in response to the stylus-based slider control feature returning to the predetermined home position, such that the stylus-based slider control feature biases back to the predetermined home position after the stylus-based slider control feature is physically moved in the first direction away from the predetermined home position and the stylus-based slider control feature also biases back to the predetermined home position after the stylus-based slider control feature is physically moved in the second direction away from the predetermined home position.

2. The system of claim 1 wherein the predetermined home position is a middle position between a maximum stylus-based slider control feature position in the first direction and a maximum stylus-based slider control feature position in the second direction.

3. The system of claim 1 wherein the stylus detection surface comprises at least one set of antenna coils configured to detect changes in a resonant circuit within the stylus.

4. The system of claim 3 wherein the stylus detection surface further comprises a second set of antenna coils configured to detect at least one of location, speed of stylus movement, angle of stylus inclination, and a change in resonant frequency of the resonant circuit within the stylus.

5. The system of claim 1 further comprising the stylus.

6. The system of claim 5 wherein, the stylus is configured to communicate with the electronic device over a wireless communication link.

7. The system of claim 1 wherein in response to the stylus-based slider control feature returning to the predetermined home position, the third input causes the function being performed at the electronic device in response to one of the first and second inputs to stop being performed.

8. The system of claim 1 wherein the user interface is configured to receive the first input in response to the stylus-based slider control feature reaching a maximum position in the first direction away from the predetermined home position, and the user interface is further configured to receive the second input in response to the slider control feature reaching a maximum position in the second direction away from the predetermined home position.

9. The system of claim 1 wherein the user interface is configured to receive a fourth input different from the first input in response to the stylus-based slider control feature reaching a maximum position in the first direction away from the predetermined home position, such that the first input occurs in an intermediate position between the maximum position in the first direction and the predetermined home position, and the user interface is further configured to receive a fifth input different from the second input in response to the stylus-based slider control feature reaching a maximum position in the second direction away from the predetermined home position, such that the second input occurs in an intermediate position between the maximum position in the second direction and the predetermined home position.

10. The system of claim 1 wherein the user interface is further configured to receive continual input in response to the stylus-based slider control feature being held in a position other than the predetermined home position.

11. The system of claim 1 wherein the electronic device is further configured to provide at least one of an audio and visual notification associated with the function.

12. The system of claim 1 wherein the function that is performed in response to the stylus-based slider control feature input is determined based on stylus location over the stylus detection surface.

13. The system of claim 1 wherein the display is a touch screen display that includes the stylus detection surface.

14. The system of claim 1 wherein the electronic device is an eReader device or a tablet computer or a smartphone.

15. The system of claim 1 wherein the function performed in response to the stylus-based slider control feature input includes at least one of adjusting a variable, executing a particular command, switching between tools, modifying a particular tool's settings, and launching an application.

16. A stylus configured to provide input to an electronic device, the stylus comprising:
an elongated body portion;
a tip on an end of the elongated body portion, the tip configured to provide input to the electronic device via at least one of direct and proximate contact with a stylus detection surface of the electronic device; and
a slider control feature on the elongated body portion, the slider control feature configured to provide input to the electronic device in response to physical movement of the slider control feature along a path that is parallel to a main axis of the elongated body portion;
wherein the slider control feature is configured to provide a first input in response to physical movement of the slider control feature in a first direction away from a predetermined home position along the elongated body portion, and the slider control feature is further configured to provide a second input different from the first input in response to physical movement of the slider control feature in a second direction away from the predetermined home position, the second direction opposite the first direction, and
wherein the slider control feature is biased to return to the predetermined home position, such that the slider control feature biases back to the predetermined home position after the slider control feature is physically moved in the first direction away from the predetermined home position and the slider control feature also biases back to the predetermined home position after the slider control feature is physically moved in the second direction away from the predetermined home position.

17. The stylus of claim 16 wherein the slider control feature is configured to provide a third input different from the first input in response to the slider control feature reaching a maximum position in the first direction away from the predetermined home position, such that the first input is provided in an intermediate position between the maximum position in the first direction and the predetermined home position, and the slider control feature is further configured to provide a fourth input different from the second input in response to the slider control feature reaching a maximum position in the second direction away from the predetermined home position, such that the second input is provided in an intermediate position between the maximum position in the second direction and the predetermined home position.

18. A non-transitory computer program product encoded with instructions that when executed by one or more processors cause a process to be carried out, the process comprising:
cause display of content via an electronic device having a stylus detection surface for allowing user input via at least one of direct and proximate contact by a stylus tip on an end of an elongated body portion of a stylus; and
perform a function at the electronic device in response to input received from a slider control feature on the elongated body portion of the stylus, the input resulting from physical movement of the stylus-based slider control feature along a path that is parallel to a main axis of the elongated body portion of the stylus;
wherein the process includes receive a first input in response to physical movement of the stylus-based slider control feature in a first direction away from a predetermined home position along the elongated body portion of the stylus, and the process further includes receive a second input different from the first input in response to physical movement of the stylus-based slider control feature in a second direction away from the predetermined home position, the second direction opposite the first direction, and wherein the process further includes receive a third input in response to the stylus-based slider control feature returning to the predetermined home position, such that the stylus-based slider control feature biases back to the predetermined home position after the stylus-based slider control feature is physically moved in the first direction away from the predetermined home position and the stylus-based slider control feature also biases back to the predetermined home position after the stylus-based slider control feature is physically moved in the second direction away from the predetermined home position.

19. The non-transitory computer program product of claim 18 wherein the function comprises at least one of performing an undo action, performing a redo action, launching a note taking application, recording a sound, recording an image, recording a video, and switching from a first tool to a second tool.

20. The non-transitory computer program product of claim 18 wherein the process further includes receive continual input in response to the stylus-based slider control feature being held in a position other than the predetermined home position.

21. A system comprising:
a stylus including an elongated body portion, the stylus further including a tip on an end of the elongated body portion and a slider control feature on the elongated body portion;
an electronic device having a touch-sensitive display for displaying content and for allowing user input via at least one of direct and proximate contact by the stylus tip; and
a user interface executable on the electronic device and configured to perform a function at the electronic device in response to input received from the stylus-based slider control feature, the input provided by physical movement of the stylus-based slider control feature along a path that is parallel to a main axis of the elongated body portion of the stylus;
wherein the user interface is configured to receive a first input in response to physical movement of the stylus-based slider control feature in a first direction away from a predetermined home position along the elongated body portion of the stylus, and the user interface is further configured to receive a second input different from the first input in response to physical movement of the stylus-based slider control feature in a second direction away from the predetermined home position, the second direction opposite the first direction, and
wherein the stylus-based slider control feature is biased to return to the predetermined home position, such that the stylus-based slider control feature biases back to the predetermined home position after the stylus-based slider control feature is physically moved in the first direction away from the predetermined home position and the stylus-based slider control feature also biases back to the predetermined home position after the stylus-based slider control feature is physically moved in the second direction away from the predetermined home position.

* * * * *